US009551980B2

(12) United States Patent
Akcasu et al.

(10) Patent No.: US 9,551,980 B2
(45) Date of Patent: Jan. 24, 2017

(54) SOLAR TIMER USING GPS TECHNOLOGY

(71) Applicant: Lonestar Inventions, L.P., Morgan Hill, CA (US)

(72) Inventors: Osman Ersed Akcasu, Morgan Hill, CA (US); Ibrahim Akcay, Istanbul (TR)

(73) Assignee: Lonestar Inventions, L.P., Morgan Hill, CA (US)

( * ) Notice: Subject to any disclaimer, the term of this patent is extended or adjusted under 35 U.S.C. 154(b) by 736 days.

(21) Appl. No.: 13/665,465

(22) Filed: Oct. 31, 2012

(65) Prior Publication Data

US 2013/0116967 A1 May 9, 2013

Related U.S. Application Data

(60) Provisional application No. 61/557,576, filed on Nov. 9, 2011.

(51) Int. Cl.
*G04G 9/00* (2006.01)
*G06F 19/00* (2011.01)

(52) U.S. Cl.
CPC .............. *G04G 9/00* (2013.01); *G04G 9/0064* (2013.01); *G06F 19/00* (2013.01)

(58) Field of Classification Search
CPC .......... G04G 9/00; G04G 9/0064; G06F 19/00
See application file for complete search history.

(56) References Cited

U.S. PATENT DOCUMENTS

| | | | | |
|---|---|---|---|---|
| 5,208,790 | A * | 5/1993 | Sato | 368/15 |
| 5,938,709 | A * | 8/1999 | Hale et al. | 701/50 |
| 6,043,778 | A * | 3/2000 | Froeberg et al. | 342/357.36 |
| 2010/0102201 | A1 | 4/2010 | Sherman | |
| 2010/0208937 | A1* | 8/2010 | Kmiecik et al. | 382/100 |
| 2011/0025559 | A1 | 2/2011 | Chansarkar et al. | |
| 2011/0096165 | A1* | 4/2011 | Zeng et al. | 348/148 |

OTHER PUBLICATIONS

International Search Report and Written Opinion of the International Searching Authority for PCT Application No. PCT/US2012/063283, mailed on Jan. 22, 2013, 10 pages.

* cited by examiner

*Primary Examiner* — Alexander Satanovsky
(74) *Attorney, Agent, or Firm* — Kilpatrick Townsend & Stockton LLP; Kenneth R. Allen; Mark P. Mathison

(57) ABSTRACT

In a GPS-equipped device such as a smart phone or a tablet computer with a compatible operating system, a useful dynamic display of directional and timing information is provided based on GPS data obtained through conventional means processed according to computational modules or applications stored on the device. These displays include a solar timer, a compass dial and other date, time and location-based information. Underlying the displayable information is a database of information that is processed with input from an accurate compass employing a calculated reference line based on two time-separated GPS readings and a direction parameter.

20 Claims, 6 Drawing Sheets

SOLAR TIMER USING GPS TECHNOLOGY

CROSS-REFERENCES TO RELATED APPLICATIONS

The present application claims benefit under 35 USC 119(e) of U.S. provisional Application No. 61/557,576, filed on Nov. 9, 2011, entitled "Solar Timer Using GPS Technology," the content of which is incorporated herein by reference in its entirety.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to uses of GPS data applied to direction and timing, and in particular to a presentation or display of such information.

As used herein a solar timer is a term referring to a package of functions incorporated in an application program comprising the present invention. It may be used in the form of a trademark SolarTimer to refer to a consumer entertainment tool made up of the package of these functions. Thus SolarTimer is a trademark of the assignee or licensee of the present invention identifying the source of the solar timer computer application package.

By way of background, the following information is provided as a tutorial on magnetic compass technology. Also following is a tutorial on GPS technology and a brief explanation of atmospheric considerations.

Magnetic Compass Basics and Earth's Magnetic Field

A conventional magnetic compass is used to set a constant direction for navigation. It is very cheap, lightweight and simple, and it can be made very small and it consumes no power. However, it has shortcomings related to its simplicity and the terrestrial environment. To understand the shortcoming issues of the magnetic compass it is useful to start from the basics of Earth's magnetic field [10, referring to cited references herein].

Earth has a magnetic field like a bar magnet which its north pole pointing towards to the Earth's magnetic north pole, a point on the northern hemisphere at which Earth's magnetic field points vertically downwards. Although it is in the northern hemisphere, by the direction of the magnetic field lines it is a "Magnetic South" pole. To be precise the "North Magnetic Pole" is in northern Canada near Ellesmere Island at 81.3° N and 110.8° W. This coordinate of the magnetic north pole is obtained from the geological survey of Canada done in 2001. The location of the Earth's magnetic north and south poles does not remain stationary; they change location over time by a small amount. It was estimated to be at 82.7° N and 114.4° W in 2005. In 2009 it was moving towards Russia at 55-60 km per year. As can be seen in FIG. 1, which is a graph of the movement of the Earth's rotational poles for the years 2001 to 2006, and showing the mean pole location for the years 1900 to 2000, the yearly change is relatively small when observed from a great distance, but it is large enough to cause navigation-related problems when traveling or surveying close or above latitudes close to the magnetic poles. (Units are milliarcseconds. This image is courtesy IERS Earth Orientation Center.) Therefore for centuries magnetic north was used successfully as a reference direction for magnetic compass usage.

There is also a "South Magnetic Pole" and due to the unsymmetrical nature of the Earth's magnetic field, it is not at the symmetrical position of North Magnetic Pole relative to the center of the Earth. So a line drawn between the North and South magnetic poles misses the center of the Earth by approximately 530 km. Both of the magnetic poles are also known as "Magnetic Dip Poles" due to the "dip" of the magnetic field lines at these points, which is also observed visually as the dip of the compass needle at these poles. South Magnetic Pole also changes with time. As an example it was at 64.6° 5 and 138.5° E in 1998 and it was estimated to be at 64.4° 5 and 137.3° E in 2010.

In addition, Earth's magnetic field strength and direction varies with location, meaning that a compass needle does not point exactly at Magnetic North everywhere on Earth. This has many reasons, but one of the main reasons is the non-uniform magnetic material composition of the Earths crust combined with the non-uniformity of the molten circulation currents in magma flow in the Earth's outer core, which is the basic source of Earth's magnetism.

Consider the effects of the non-uniform magnetic material composition in the Earth's outer crust which is solid. If there is a large iron or nickel ore deposit with magnetic properties in a localized area in the Earth's crust, one should expect some inaccuracies in the magnetic compass readings at those locations. Basalt is an iron-rich volcanic rock that covers the ocean floor and contains a strongly magnetic material called magnetite. It locally distorts the magnetic field lines of the Earth, which results in wrong heading and direction information to nearby compasses. This was discovered in the late $18^{th}$ century by Icelandic mariners. Presence of the Earth's magnetic field gives the basalt measurable magnetic properties, which these magnetic data provided as another means to study the deep ocean floor. The changes in the Earth's magnetic field are recorded in the lava flow when it cools.

The recorded basalt magnetic data shows that Earth's magnetic field not only changed by a small amount, but actually reversed with an average period of 200,000 to 300,000 years in the past! However the last magnetic pole reversal event, which is also called Brunhes-Matuyama reversal, is calculated that it occurred approximately 780,000 years ago.

All these observable effects causing the compass needle not to point always towards the Magnetic North Pole everywhere on Earth is known as Magnetic Declination, and it is a very important piece of information in navigation [7-9]. The data is given in form of maps with contour lines of zero and equal declination that are called agonic and isogonic lines respectively. The magnetic field of Earth is measured at a very large number of sampling points on Earth by government organizations over time, because it varies considerably with time as well. Unfortunately variation does not have as long a period of time as the pole reversal. Therefore, updates are published at least twice a year. For example as of March 2010 in the San Francisco area, the magnetic north is about 14.3 degrees east of the true north, which is the geographical north, with the difference decreasing by about 6 minutes of arc per year.

Another good example to illustrate the importance of the Magnetic Declination can be found along the eastern seaboard of United States. The declination varies from 20 degrees west in Maine to zero degrees in Florida and 10 degrees east in Texas! This range of variation cannot be explained by the geographical location difference between the magnetic and true north. Thus a magnetic compass with a map without an updated Magnetic Declination map is insufficient for accurate navigation.

The magnetic field strength of the Earth was initially measured by Gauss in 1835 and has been measured periodically ever since by many means, including satellites such as Magsat and Orsted using very accurate 3-axis vector magnetometers [16]. The strength of the flux density at the Earth's surface ranges from less than 30 microteslas (0.3 gauss) in an area including most of South America and South Africa to over 60 microteslas (0.6 gauss) around the magnetic poles. The average flux density in the Earth's outer core is calculated to be 25 gauss, about 50 times stronger than the magnetic field at the surface. The flux density at the surface of the Earth is relatively small compared to any man-made permanent magnet in the close proximity of a magnetic compass. Therefore presence of a magnet or a magnetic material which has high magnetic permeability, $\mu_r$, in close proximity to the magnetic compass will perturb the Earth's magnetic field locally resulting in incorrect direction finding [21,22]. As an example, silicon steel, which is used for transformers and electrical machinery such as electric motors, generators and relays, has magnetic permeability in the order of 40,000, iron and nickel have magnetic permeabilities in the order of 5,000 and 600 respectively. Presence of materials with such high permeabilities in large quantities will change the Earth's magnetic field locally as a function of their shape and their orientation with Earth's magnetic field. This property was used in submerged submarine detection and in magnetic mines since World War II. Even low flying aircraft with suitable instruments can detect the anomalies in the Earths magnetic field caused by submerged submarines. Therefore to have a compass that works correctly in the proximity of magnetic or ferro-magnetic material requires complex and costly calibration. This is done for all the navigation-grade compasses, making the compass large and heavy.

Other sources of spurious magnetic fields that disrupt a compass include any permanent magnet close to a magnetic compass and electric currents in general: Electric current produces a magnetic field [21,22]. Electric currents can be man made due to electric currents in electronic equipment nearby, due to power distribution networks or they can be natural, originating from space. Presence of a small electric current in the proximity of a compass is enough to perturb the Earth's magnetic field resulting in wrong reference direction finding. So, for accurate direction finding with a magnetic compass, all the electronic equipment should be kept away.

When a charged particle with a velocity enters an electromagnetic field a force called Lorentz force will be generated and which will act on the particle, resulting change its trajectory [21,22]. The magnetic component of the Lorentz force is determined by the sign of the charge of the charged particle and its vector product (curl) of the velocity vector v and the magnetic field flux density vector B. The presence of the Earth's magnetic field protects the Earth by deflecting most of the high energy bombardment of charged particles mainly originating from the sun due to this Lorentz force. Some of the charged particles are trapped in the Van Allen radiation belt that encircles the Earth. A smaller number of high energy charged particles manage to escape and interact with the gases in the upper atmosphere and ionosphere in the auroral zones creating beautiful bright auroras visible from the Earth's surface. These naturally occurring currents mainly generated in the upper atmosphere near the magnetic poles will perturb the compass reading as well.

For all these reasons there was a historic need for another method of reference direction setting in navigation. Gyrocompass based instruments historically answered this void in navigation very successfully. However, gyro-compasses are heavy, bulky and require very precise mechanics to manufacture, and they consume a large amount of power due to high rotational speeds required to operate accurately. They also have issues when used at very high latitudes like the magnetic compass. A recent design modification to the conventional gyro-compass is very accurate three axes accelerometers and laser gyros. However, these are expensive, require settings beforehand and are not available to everyone.

GPS Basics, Present Capabilities and Brief History

The Global Positioning System (GPS) is a navigation system that provides very accurate position, navigation and timing information any time and any place on Earth. By updating the position over time the system can also provide speed and directional information. Using information gathered from man-made satellites orbiting the Earth providing timing information with onboard extremely accurate atomic clocks, position can be determined to varying degrees of accuracy through calculations. Those calculations also show that if an observer on Earth can have a minimum of four satellites electronically visible, then by knowing their distances to the observer, location and altitude can be calculated anywhere on Earth. Excellent reading materials exist on the subject [1, 2], but it is useful to review some of the highlights of the GPS technology. Understanding requires expertise in very wide and seemingly unrelated areas, from surveying to satellite technology, from electronics to propagation and communication theory, from motion of objects in orbits to relativity theory and atomic clocks, and all are combined with complex calculations.

The accuracy of predicting the observer's location depends on many variables but most important is the knowledge of the distance to a minimum of four satellites as accurate as possible. This is achieved with very precise time information obtained from the atomic clocks in the GPS satellites that is sent along with the radio signal.

I. Smith's patent filed in 1964 describes a satellite system that would emit time codes and radio waves that would be received on Earth as time delayed transmissions creating hyperbolic lines of position. Several years later another patent filed by R. Easton refined the concept of comparing the phase from two or more satellites. In 1972 C. Counselman along with his colleagues in Massachusetts Institute of Technology (MIT) reported on the first use of interferometry to track the Apollo 16 Lunar Rover Module. The technique was applied in the development of the first geodetic GPS receiver and corresponding to differencing pseudo-ranges measured from two receivers to one satellite. The present use of the GPS carrier phase to make millimeter vector measurements dates to Very Long Baseline Interferometry (VLBI) work performed between 1976 and 1978. In 1986, B. Remondi first demonstrated that sub-centimeter vector accuracies could be obtained between a pair of GPS survey instruments with as little as a few seconds of data collection. B. Remondi later developed another survey technique which is called pseudo-kinematics, also known as intermittent static, snapshot static or reoccupation, which yields similar sub-centimeter accuracies. In this technique a pair of receivers occupies a pair of points for two brief periods that are separated in time. An Interferometric technology for codeless pseudo-ranging was developed by P. Mac Doran in Jet Propulsion Laboratory (JPL). With the Interferometric and VLBI techniques yielded the first portable codeless GPS receiver that could measure short baselines to millimeter accuracy and long baselines to one part per million. The codeless portable receiver development, trade-named Macrometer Interferometric Surveyor was demonstrated by the U.S. Federal Geodetic Control Committee. In 1981 U.S. National Geodetic Survey (NGS) and U.S. Geological Survey (USGS) developed specifications for portable dual frequency code correlating receivers that could be used for precise surveying and post processing. Texas Instruments was awarded the contract and produced the TI-4100 receiver. NGS geodesists C. Goad and B. Remondi developed the software to process its carrier phase data interferometrically as previously used by the MIT group.

In 1985 C/A code receivers started to output the carrier phase, and the first of these receivers was trade-named Trimble 400S and used vector computation software. Goad set the standard of the future software developers. At that time it required the processing power of a laptop computer to do the required computations.

For positioning any where on Earth, any time, more than four satellites are needed. The current GPS system consists of 24 evenly placed satellites in circular 12 hour orbits inclined 55 degrees to the equatorial plane forming a constellation. Currently there are more than 31 GPS satellites, with some used for back-up. They are referred to as NAVSTAR (Navigation Satellite Timing and Ranging) satellites. This near-circular orbit gives 20,200 km of altitude above the Earth. This configuration of satellites provides electronic visibility for minimum of 4 to 8 satellites with higher than 15 degrees of elevation from the horizon anywhere, anytime on Earth. For elevation angle of 10 degrees, or occasionally 10 degrees and 5 degrees of elevation, there will be 12 satellites electronically visible. In brief periods of time with an elevation angle of 10 degrees there can be up to 10 GPS satellites from which the most accurate positioning information can be obtained. Having more satellites electronically visible at higher elevation angles provides a means of making corrections in the calculations for much more accurate positioning.

Satellites basically provide a platform for radio transceivers, atomic clocks, computers and auxiliary equipment. There are six classes of satellites which are named Block 1, II etc., ranging from 845 kg to 2,000 kg, 5 meters across with two rubidium and two cesium atomic clocks with long-term frequency stability of a few parts in $10^{-13}$ and $10^{-14}$ per day. These atomic clocks almost synchronize everything, including the fundamental L-band frequency of 10.23 MHz. Coherently derived from this fundamental L-band signal are the L1 and L2 carriers which are at 1575.42 MHz and 1227.60 MHz respectively. The center frequencies of both bands are integer multiples of the L-band frequency of 10.23 MHz. The transmitter RF output power is 50 Watts or less.

Each satellite broadcasts two different direct-sequence spread spectrum signals with many lobes having a total bandwidth of 20 MHz. Having two signals is essential for eliminating the major source of error, which comes from the ionospheric refraction. The pseudoranges that are derived from measured travel times of the signal from each satellite to the receiver use two pseudorandom noise (PRN) codes that are modulated onto the two base carriers. PRN sequences are often called chips, and they do not carry data.

The first code is C/A-code, designated as the Standard Positioning Service (SPS) or known as coarse code is in the L1 band. The C/A-code uses 10.23 MHz chip rate. The main lobe of the C/A-code has a bandwidth of 2 MHz and occupies the entire 20 MHz bandwidth. The second code is the P-code (Precision-code), which is reserved for military and other authorized users, is broadcast in both L1 and L2 bands. The P-code is much more difficult to detect and uses a spreading code that only repeats at 1 week intervals and is encrypted. Its main lobe occupies the entire 20 MHz bandwidth due to a different chip rate, which is 10 times higher compared to the C/A-code. The signal strength in the L2 bands is half the strength compared to the L1 band. The outlying lobes of the P-code are truncated so that the entire GPS broadcast fits into its 20 MHz allocated bandwidth. While the P-code provide precise navigation information, by use of computational techniques, the C/A-code can be used to calculate reasonably accurate positioning information as explained below.

In addition to these codes a data message is modulated on the carriers consisting of status information, satellite clock bias, ephemerides and almanac data. The ephemerides data contains satellite ID number, current GPS week, ephemerides reference epoch, square root of semi-major axis, eccentricity, mean anomaly at reference epoch, argument of perigee, inclination, longitude of the node at weekly epoch, mean motion difference, rate of inclination angle, rate of node's right ascension correction coefficients, satellite clock reference epoch, satellite clock offset, satellite clock drift and satellite clock frequency drift. As can be seen the data is very comprehensive and using the data one can determine the satellite orbits and more.

Having a 50 Watts of RF transmit power and a distance of 20,200 km from the Earth surface going through the full thickness of ionosphere and troposphere results in a very low levels of received power on the surface of the Earth. The received power varies, but typically is around −130 dBm at the antenna of the receiver. For the primary lobe of the C/A-code which has a bandwidth of 2 MHz and for an antenna temperature of 290K the noise power is −111 dBm, approximately 20 dB lower than the noise floor, giving signal-to-noise ratio (SNR) at the antenna to be about −19 dB. Once the signal from a given satellite is correlated with the PRBS code, the bandwidth is reduced to only 100 Hz! So with a noiseless ideal receiver, the post-correlation SNR would be 24 dB.

To extract information from this level of very low power RF signals requires very high quality RF front ends and antenna designs in addition to sophisticated DSP and circuit techniques.

In commercial grade GPS, the accuracy in determining the location using only the C/A code is in the order of 10 meters. This accuracy can vary due to many factors such as terrain, loss of radio visibility to some satellites due to blocking objects such as buildings, multi-path effects and the like. More accurate GPS systems are available for civilian services by several means. Very precise location information is also provided by the introduction of WAAS or Wide Area Augmented System in 2004. GPS systems that utilize WAAS usually have accuracy of (1 to 3) meters. GPS systems can be even made more accurate by using subscription-based satellite correction or Real Time Kinematic local correction base stations to provide corrections to within 20 cm or about 9 inches for civilian use. (Military grade accuracy is better than these numbers.)

In a dedicated navigation or military grade receiver the designer has the luxury of design flexibility in a robust GPS reception system. The design of GPS system on a cell phone platform in an add-on application brings several limitations on basically everything from the antenna to the low noise amplifier (LNA). In addition to weight and size constraints there is also a radio frequency (RF) amplifier to perform its main function, which is communication, with an output power in the order of 900 mW, a frequency right next to the GPS receiver in frequency ranges of 800 MHz to 2.4 GHz, and thus a source of potential interference or desensing. Despite all of these disadvantages the resulting GPS capability provided in a smart phone today is surprisingly accurate. A typical smart phone or tablet computer can provide position information with an accuracy of 20 meters most of the time, anywhere on Earth and. Pushing it further probably is not needed for nonmilitary use.

As explained GPS is basically is a very sophisticated radio navigation tool. The earlier work on radio navigation goes back to at least the 1930's. Pioneered by German engineers in 1930's with the development of "Beams" or known as "Lorentz" system to guide the pilots for landings at night or poor visibility conditions, two highly directional radio transmitters are set side by side and transmit parallel radio signals. One signal consists of series of pulses in the form of a beep or dot. The other signal consists of a dash or a longer pulse. This distinct difference between the left and right signals gives the pilot a capability to fly the beam. In World War II both parties developed more advanced techniques to fly and navigate at night or under poor weather conditions with later work resulting in a system called HIRAN (High RAnge Navigation) using arcs of trilateration to position aircraft.

In 1946 in Finland an optical method based in principal on the stellar triangulation method was put in use very successfully. This required clear sky with a minimum of 4,000 km of separation between two observing sites. The equipment was large and expensive but it was successfully used for defining the European base line from Tromso in Norway to Catania in Sicily.

In the 1950's Dr. Ivan Getting made a breakthrough in radio navigation by developing the first "three dimensional position finding system based on the time of arrival" of radio signals that became the basis of GPS navigation. Conceptual catalyst for the satellite component of GPS was made by the launch of the first-man made satellite Sputnik in 1957 by the Soviet Union. Researchers in MIT realized that they could track Sputnik's orbit with the use of Doppler shift. This knowledge coupled with the ability to compute satellite ephemerides according to Kepler's laws led to the present capability of instantaneously determining precise position anywhere in the world.

The immediate predecessor of today's GPS system is the US Navy Satellite System (NNSS), also called as the TRANSIT system. The system had 6 satellites orbiting at altitudes of 1,100 km with nearly circular polar orbits.

Dr. Ivan Getting and Bradford Parkinson and MIT began development of the GPS in use today as a project for the US Department of Defense in 1973. Transmission was tested in 1977 and the first satellite launch was in 1978. The GPS satellite network and navigation system is owned by the US Government funded by the US Department of Defense developed maintained and operated by the US Air Force. It was declassified and made public in 1983 by President Ronald Reagan. It is free and a great service for all, provided by the US Government and it has had a great impact in navigation and the improvement of the air and sea travel safety since its implementation.

Computing Capabilities and Accuracy

There are many sites on the Earth's surface where the sun's elevation and azimuth angle calculations are done and published with accurate results, but mostly in the range of 60 degrees north latitude to 60 degrees south latitude. The general concepts qualitatively are explained very clearly in reference [19]. The reason for this is not because of lack of interest, or small population densities at higher or lower latitudes close to the poles, it is due to the mathematical difficulties in the calculations.

Calculation of the sun's elevation and azimuth angles as a function of time and date at higher and lower latitudes close to the poles becomes very complex. The basic reason of the complexity comes from the day and night at those higher latitudes can last more than 24 hours, even several months, depending on the date. The boundary for these regions is given by the Arctic Circle's definition. Arctic Circle is defined as the latitude which at least for one day a year the sun will be visible for 24 hour period [14]. The majority of the sun tracking algorithms and formulas take the day as 24 hours. However above the Arctic Circle in northern hemisphere and below the Antarctic Circle in the southern hemisphere, this assumption is invalid, and so the sun tracking algorithms and formulas with that assumption fail [2]. The position of the Arctic Circle changes with time by small amounts. For Epoch 2011 it is at latitude 66 Degree 33'44" (66.5622 Degree) North. The Antarctic Circle is at the symmetric position of the Arctic Circle with respect to the Equator which is at 66 Degrees 33'44" (66.5622 Degree) South.

As of Aug. 26, 2011 the sun elevation and azimuth angle calculation results of the present invention as hereinafter explained matches the NREL (National Renewable Energy Laboratory) results "exactly" below 68 Degree North or above 68 Degree South latitudes [11]. In the NREL Solar Positioning Algorithm (SPA) report [12] the claim is ±0.0003 degrees accuracy "where ever they can give results." As of Aug. 26, 2011 NREL did not produce any data above 68 Degree North or below 68 Degree South latitudes. It is inferred that the program crashes for day lengths exceeding the 24 hours. Since the accuracy related claim given in the SPA report is ±0.0003 degrees accuracy "where ever they can give results", this does not violate their claim, although it is incomplete.

Again, as of Aug. 26, 2011 the sunrise and sunset results produced by the present invention are within a second of NOAA (National Oceanic and Atmospheric Administration) results below 78 Degree North or above 78 Degree South latitudes [13]. For below 78 Degree South or above 78 Degree North latitudes NOAA gives the sunrise and sunset dates but with different results compared to observed and recorded dates as given in [15].

The present invention matches the historic data as published almost exactly at those extreme latitudes. The technical challenge is to predict the sun's elevation angle above the Arctic Circle over a period of a year, not merely on a selected convenient day. US Naval Observatory [15] and current invention results match extremely well in any latitude at any date, and both are all in line with historical measured data. This type of correlation with official USNO numbers over an entire year period, especially in the extreme latitude is considered remarkable. Finding this type of correlation with USNO numbers over an entire year period, especially in the extreme latitudes was very encouraging for us! It wasn't very surprising for us to find very accurate sun's elevation angle computing capability in US Naval Observatory internet site. After all navigation science is their "traditional" expertise more than any one in the US! In addition to that USNO also maintains the UTC (Universal Time Coordinated) which is the time reference of the GPS [1].

FIG. 6 shows the sun's yearly elevation angle variation from the horizon for extreme Arctic latitudes like the North Pole, the Magnetic North Pole, Barrow, Ak. and Narvik, Norway. Their GPS coordinates are given as in FIG. 6 are (90° N, 0° W), (81.3° N, 109.2° W), (71.2° N, 156.6° W) and (68.4° N, 17.4° E) respectively. As can be seen the USNO and SolarTimer results are indistinguishable over a period of a year. Another excellent source of reference and correlation is also found to be with the Australian Government Geoscience Australia, especially in the elevation angle calculations of the moon [15,16] which is also displayed in the SolarTimer compass dial.

Altitude can have fairly important effect on the sunrise, sunset times and twilight times. The magnitude of the altitude effects on the sunrise, sunset times and twilight times depend on the latitude and the date. Noon does not change as expected but the altitude effects on the twilight, sunrise and sunset times are fairly significant.

Atmospheric Effects

When talking about the sunrise and sunset issues in the extreme latitudes one has to consider the atmospheric effects as well. Atmospheric pressure and temperature are included as input variables in the software package "OEA Astronomic and Navigational Computing Utilities" which takes care of the atmospheric refraction effects on the sun's elevation angle calculations up to a certain extent for normal conditions. Since the smart phone or computer tablet does not have the temperature and atmospheric pressure information, these variables are set to some reasonable values internally. In extreme latitudes there are more dominant effects caused by Mirage's which are not taken into consideration There is a well known phenomenon called mirage which can change the apparent sunset and sunrise under certain conditions. In certain mirage conditions it has been recorded that when the evening sun has gone down for over 20 minutes it is still clearly visible [20]. These extreme conditions generally happen when there is very high temperature gradient, higher than 2° C. per meter and generally higher than 4-5° C. per meter over the ground. These conditions occur when there is strong heating at the ground level, and an "inferior" image is commonly generated as a result of this. It is called an inferior image because the resultant image seen is under the real object, in this case the sun. Inferior images are not stable. This type of inferior mirage is very often seen on highways, deserts, airport runways and it looks like water on the surface. Hot air rises and cooler air descends. In the process, the layers mix, and turbulence will cause distortion of the image. The image might look as if it is distorted, vibrating; it might seem as if vertically extended. If there are several layers there can be multiple images. In any case, inferior images are not larger than one degree in height.

A "superior" image occurs when the air below the line of sight is colder than that above. This is called temperature inversion, since it does not represent the normal temperature gradient of the atmosphere. In this case, light rays are bent down so the image appears above the true object. Therefore they are called superior mirages. Superior mirages are in general less common than the inferior mirages, but when they occur, they tend to be more stable. This is due to the fact that the cold air has no tendency to move up or warm air to move down. Superior mirages are more common in Polar Regions, especially over large sheets of ice with a uniform low temperature, but they have been recorded in lower latitudes such as in San Francisco.

One of the most historic and striking events related to superior mirage happened to William Barents during his search for the Northeast Passage in 1596. When stuck in the ice at Novaya Zemlya, the crew saw the midwinter night come to an end with a distorted sun about two weeks earlier than expected!! The real sun was still below the horizon, but its light rays followed the curvature of the Earth. This effect is often called Novaya Zemlya. For every 111.12 km that light rays can travel parallel to the Earth's surface, the sun will appear 1° higher on the horizon. If the vertical temperature gradient is +11° C./100 m than the horizontal light rays will just follow the curvature of the Earth.

Hereafter are references that are for further reading or that are cited in this document.

REFERENCES

1. "Global Positioning System, Theory and Practice," B. Hofmann-Wellenhof, H. Lichtenegger and J. Collins, Copyright 1992, 1993, 1994, 1997 and 2001, Springer Wien NewYork, 5th Edition, ISBN 3-211-83534-2.
2. "The Design and Implementation of Low Power CMOS Radio Receivers", Derek K. Shaeffer, Thomas H. Lee, Copyright Kluwer Academic Publishers, 1999, 2000, ISBN 0-7923-8518-7.
3. "Astronomical Algorithms", Jean Meeus, Second Edition ISBN-10: 0943396352, Copyright 1991, Willmann-Bell, Inc.
4. "Mathematical Astronomy Morsels V", Jean Meeus, ISBN 978-0-943396-92-7, Copyright 2009, Willmann-Bell, Inc.
5. "Fundamentals of Celestial Mechanics", J. M. A. Danby, Second Edition, ISBN 0-943396-20-4, Copyright 1962, 1964, 1988, 1989, 1992, 1998, 2003, J. M. A. Danby, Published by Willmann-Bell, Inc.
6. "Fundamentals of Ephemeris Computations for use with JPL Data", Paul J. Heafner, ISBN 978-0-943396-92-7, Copyright 1999, Willmann-Bell, Inc.
7. http://www.ngdc.noaa.gov/geomagmodels/struts/calc-Declination
8. http://www.ngdc.noaa.gov/geomagmodels/Declination-.jsp
9. http://www.en.wikipedia.org/wiki/Magnetic_declenation
10. http://www.en.wikipedia.org/wiki/Earths_magnetic-_field
11. http://www.nrel.gov/midc/solpos/spa.html
12. http://rredc.nrel.gov/solar/codesandalgorithms/spa/13.
13. http://www.esrl.noaa.gov/gmd/grad/solcalc/14.
14. http://www.en.wikipedia.org/wiki/Arctic_Circle
15. http://aa.usno.navy.mil/data/docs/RS_OneYear.php
16. http://www.ga.gov.au/geodesy/astro/smpos.jsp
17. http://code.google.com/apis/maps/documentation/static-maps
18. http://developer.apple.com/library/ios/#DOCUMENTATION/CoreLocation/Reference/CLLo cationManager-_Class/CLLocationManager/CLLocationManager.html
19. http://www.pveducation.org/pvcdrom
20. http://en.wikipedia.org/wiki/Mirage
21. "The Feynman Lectures on Physics", Richard P. Feynman, Robert B. Leighton, Matthew L. and Sands, Copyright 1963, 1989 California Institute of Technology, ISBN 0-201-51003-0
22. "Engineering Electromagnetic Fields and Waves", Carl T. A. Johnk, John Willey & Sons, Copyright 1975, ISBN 0-471-44289-5

23. http://www-istp.gsfc.nasa.gov/stargaze/Sprecess.htm
24. http://www2jpl.nasa.gov/basics/bsf2-1.php
25. http://en.wikipedia.org/wiki/John_Harrison
26. http://www.emporia.edu/Earthsci/student/howard2/theory.htm
27. http://www.willbell.com/math/mcl.htm

SUMMARY OF THE INVENTION

According to the invention, in a GPS-equipped device such as a smart phone or a tablet computer having a processor, storage memory, inputs and outputs with a compatible operating system, a useful display of directional and timing information is provided based on GPS data obtained through conventional means processed according to computational modules or applications stored on the device. These displays include a solar timer, a compass dial and other date, time and location-based information. Underlying the displayable information is a database of information that is processed with input from an accurate compass employing a calculated reference line based on two time-separated GPS readings and a direction parameter.

The invention has a wide range of portable applications by users such as hikers, campers, fireman, rescue workers, police officers, outdoorsmen, youth scouts, farmers, navigation hobbyists, students, mariners, fisherman, architects, solar energy field installers, satellite dish installers, as well as military personnel. It is capable of being customized by the user and be the "Swiss Army Knife" of any smart phone.

A key feature for ease of use is a compass display that presents a very large amount of information in the very limited space of the touch screen of a smart phone or tablet computer and which is very easy to comprehend. The same display is also used as a data entry element to collect user input without bringing confusion to the usage. The issue solved is the presentation of sufficient information in a constrained space that is readily comprehended with minimal confusion. The development of a "dynamic" compass display solves a real problem.

Other challenges were to be able to rapidly perform these complex calculations in limited computing hardware provided by a smart phone or a tablet computer. The calculations are done in substantially real time on a smart phone, and the calculations are fast enough to allow animation effects possible on yearly elevation and azimuth angle variations.

In addition to very accurate sun tracking information, the invention gives information including sunrise, sunset, day and night length, sun's sweep angle during the day, elevation angle at the zenith point and time in military, civilian and astronomic twilight formats, the moonrise, moonset times, elevation and azimuth angle of the moon, moon day and night length, moon fazes, incoming solar radiative power density, and air mass. These complex calculations are done for any place on Earth, any date, past, future or present, from the North to the South Pole, and the information is displayed dynamically on a small display screen.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION OF THE INVENTION

Figure 1:
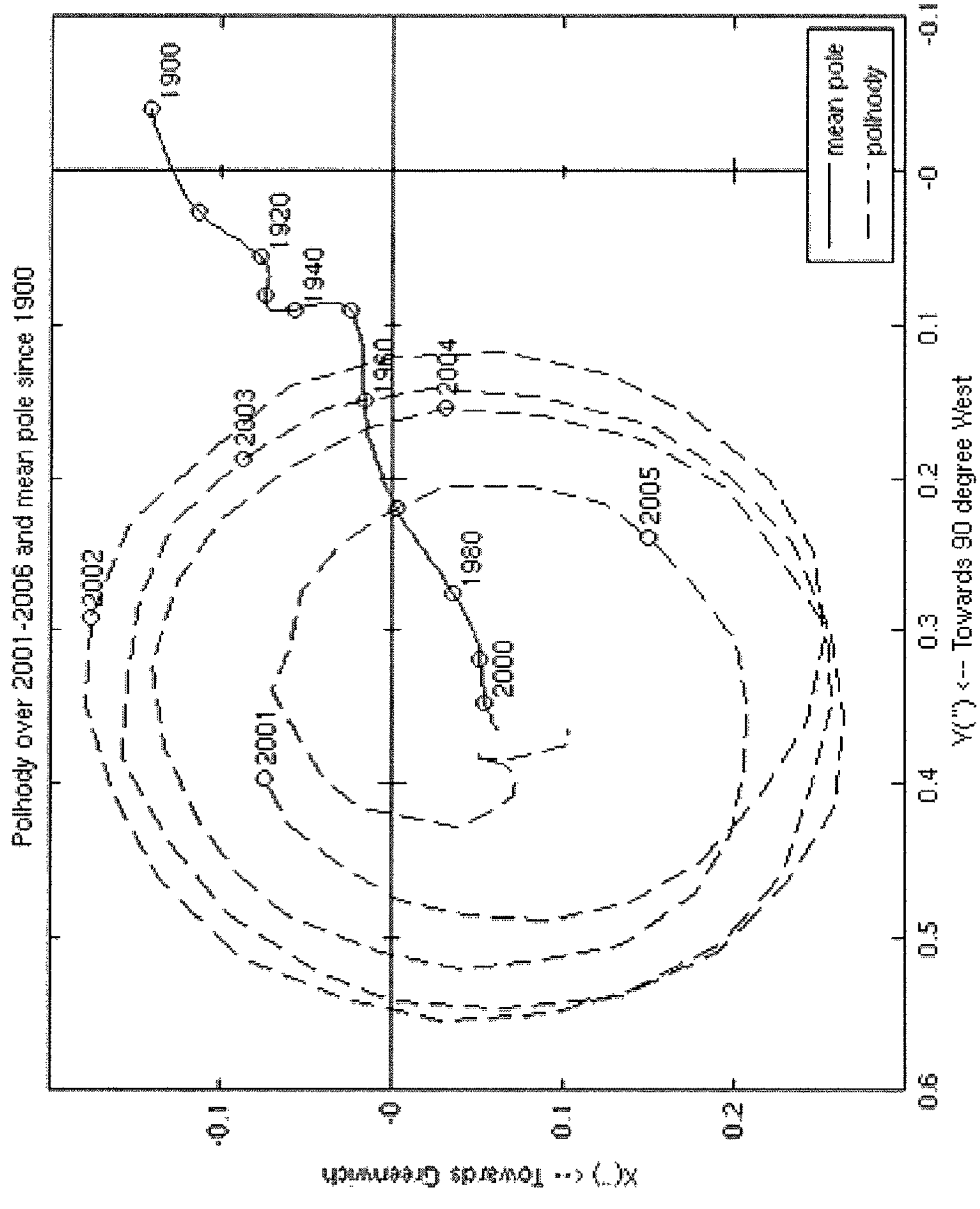
FIG. 1 is a graph showing the variation of the Earth's magnetic north pole over time.

The subject matter of embodiments of the present invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The basis of the present invention is a GPS compass incorporated into a device with a display, a processor, storage memory and manual input as well as inputs from sensors, and in particular in a portable device such as a smart phone or tablet computer equipped with a conventional GPS receiver that depicts positions of interest in time relationship of terrestrial and celestial bodies in connection with the compass. Thus the invention is instantiated in a smart phone or a tablet computer application that can be installed on a variety of platforms through a selection of mobile operating systems. The method underlying the present invention is the defining of a "Reference Line" and relating the directions toward a desired target referenced to it. The "Reference Line" becomes equivalent to a conventional magnetic compass needle and the target direction will be calculated taking the reference line as the reference direction. To define a line, two points are needed. In this case these are called the "Reference Point" and the "Mark Point." The "Reference Line" can be in any direction but the angle errors are related to its length and its orientation with respect to the target coordinates. To obtain reasonable accuracy in any direction and target coordinates, the distance between the "Reference" and "Mark" points should be in the order of 200 meters or greater. However, a lesser separation is suitable for many applications.

A user defines a "Reference Point" by recording the GPS coordinates of it by just pressing a button on the GPS compass display and then physically moving away from it while the GPS receiver monitors satellite transmissions. When moved far enough, the device will indicate that the distance from the reference point is sufficient and suitable for giving accurate enough directional information to the selected target referenced to the reference line based on any preselected accuracy criteria. The user than turns and points the device toward the "Reference Point" and records the current GPS coordinate as the "Mark Point", again by just pressing a virtual button on the GPS compass display. After entering the GPS coordinates of the target, the GPS compass calculates the angle that the user (actually the device) must turn in order to point to the target.

The GPS compass will also generate a compass dial display with conventional markings, such as North, South, East and West, referenced to the reference line pointing towards to the "Reference Point".

Thus in principal, walking a distance in the order of 200 meters and pressing two buttons and entering a target GPS coordinate will provide compass capability to anyone with a commercial grade GPS device having some computing capabilities—anywhere and any time on Earth with a consistently reasonable accuracy. Since the required hardware is available in a smart phone this technique is utilized with a simple user interface.

With a baseline of greater than 200 meters of distance between the Reference Point and the Mark Point, the majority of the errors are due to aiming error in pointing to the Reference Point from the "Mark Point" as well as due to errors made during turning towards to the target. This is user dependent. The error is typically expected to be less than 6 degrees.

GPS Compass

Figure 5:
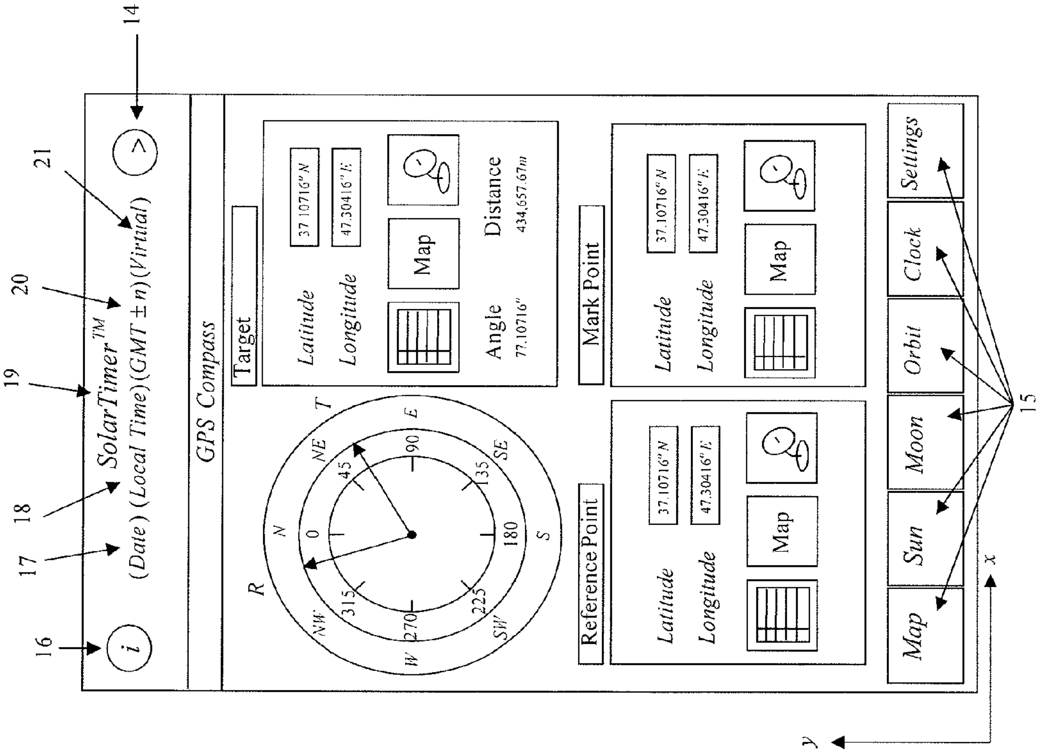
FIG. 5 is a view of a GPS compass with a data entry window.
Figure 6:
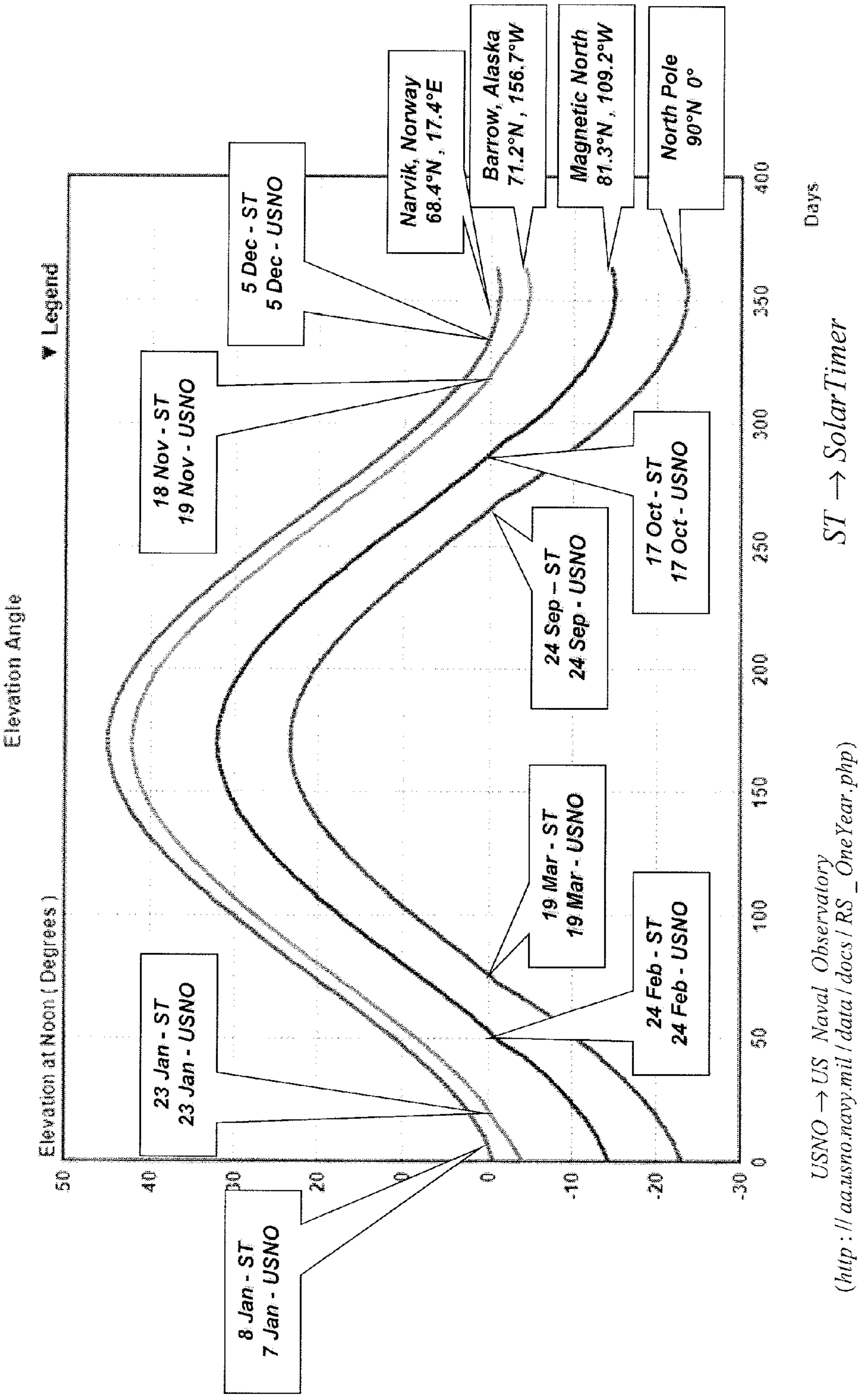
FIG. 6 is a graph showing variation in sun elevation angle at locations above the Arctic Circle.

In a specific embodiment of a device according to the invention, there is an application program that produces a graphical display with a variety of information that is displayed on a display element of a platform of a GPS-equipped device such as a smart phone or tablet computer. Within the display element, the top left region has a compass dial. In the bottom row there are two identical data entry windows named "Reference Point" and "Mark Point." They have data fields for latitude and longitude, with three icons below them. The icons are the yellow node pad which corresponds to the "Location" in the main menu display, "map" and a "parabolic antenna," which symbolizes the GPS as shown in FIG. 5. On the top row, next to the compass there is a data entry window named "Target." The data entry window looks the same as "Reference Point" and "Mark Point" data entry windows but with an additional data display line in the bottom giving the calculated turning angle when facing the "Reference Point" from the "Mark Point" in clock-wise direction and distance to the target side by side.

According to the invention, most of the calculated detailed information is displayed numerically in the form of tables and graphs accessed through a tool bar which has menu icon buttons in the bottom of the touch screen. With an additional options button that gives a different number of options for each selected menu item, there is access to a very large number of calculated information using different display pages. All of the information is grouped, so any selected menu item has related information.

Figure 2:
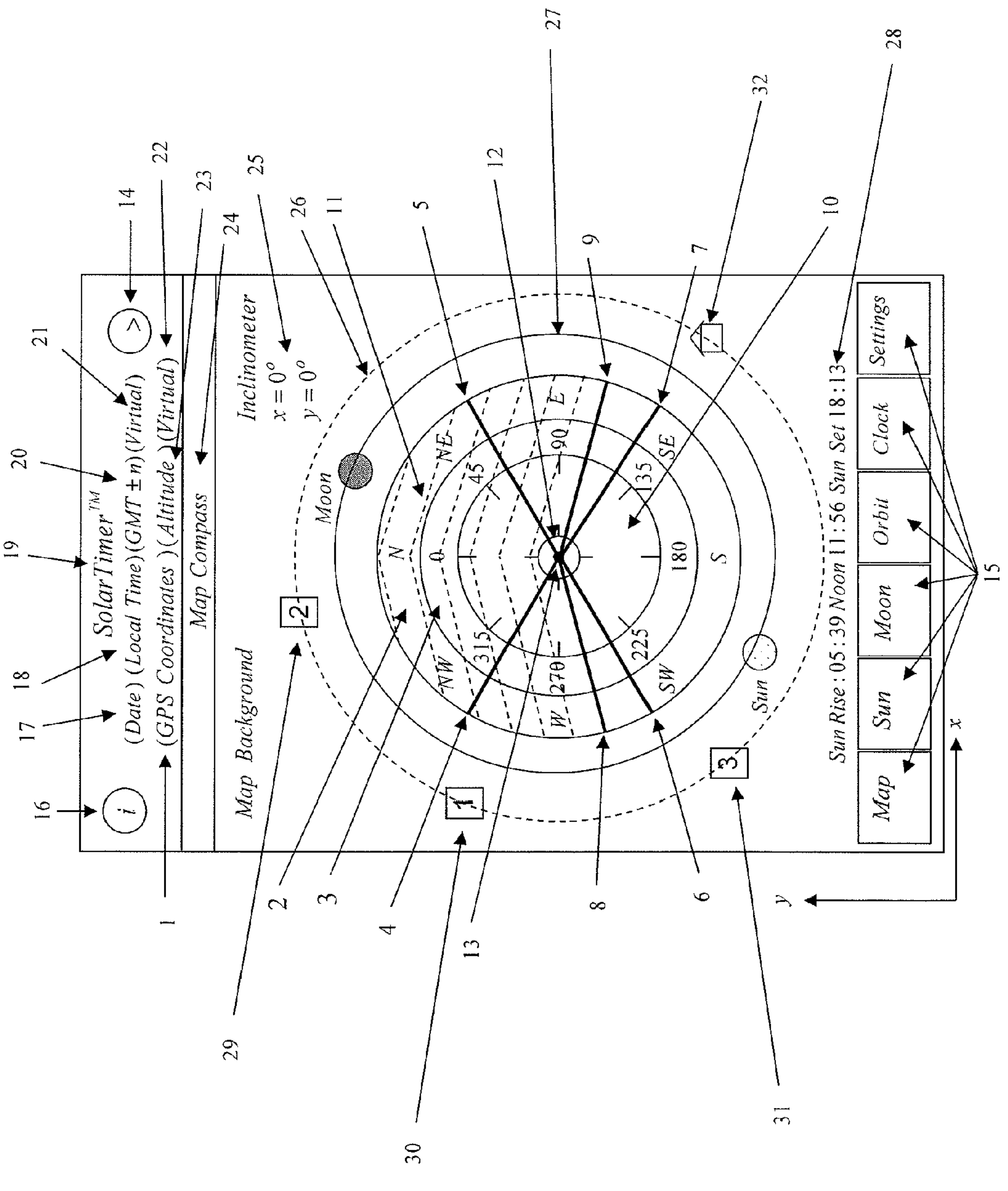
FIG. 2 is a line drawing representation of a display of a device according to the invention, without the magnetic compass option.

The smart phone or tablet display area is split into three regions. FIG. 2 illustrates a graphical explanation of the input and output display functions. The majority of the display area is for showing the map of choice, which is a map background to the display. A sample map is not shown in order to allow better depiction of the overlay functions. In the center there is the unique Compass Dial superimposed on a map, such as may be obtained by available online resources. The three regions of display have several areas as follows.

The "Header Display" Area

Figure 3:
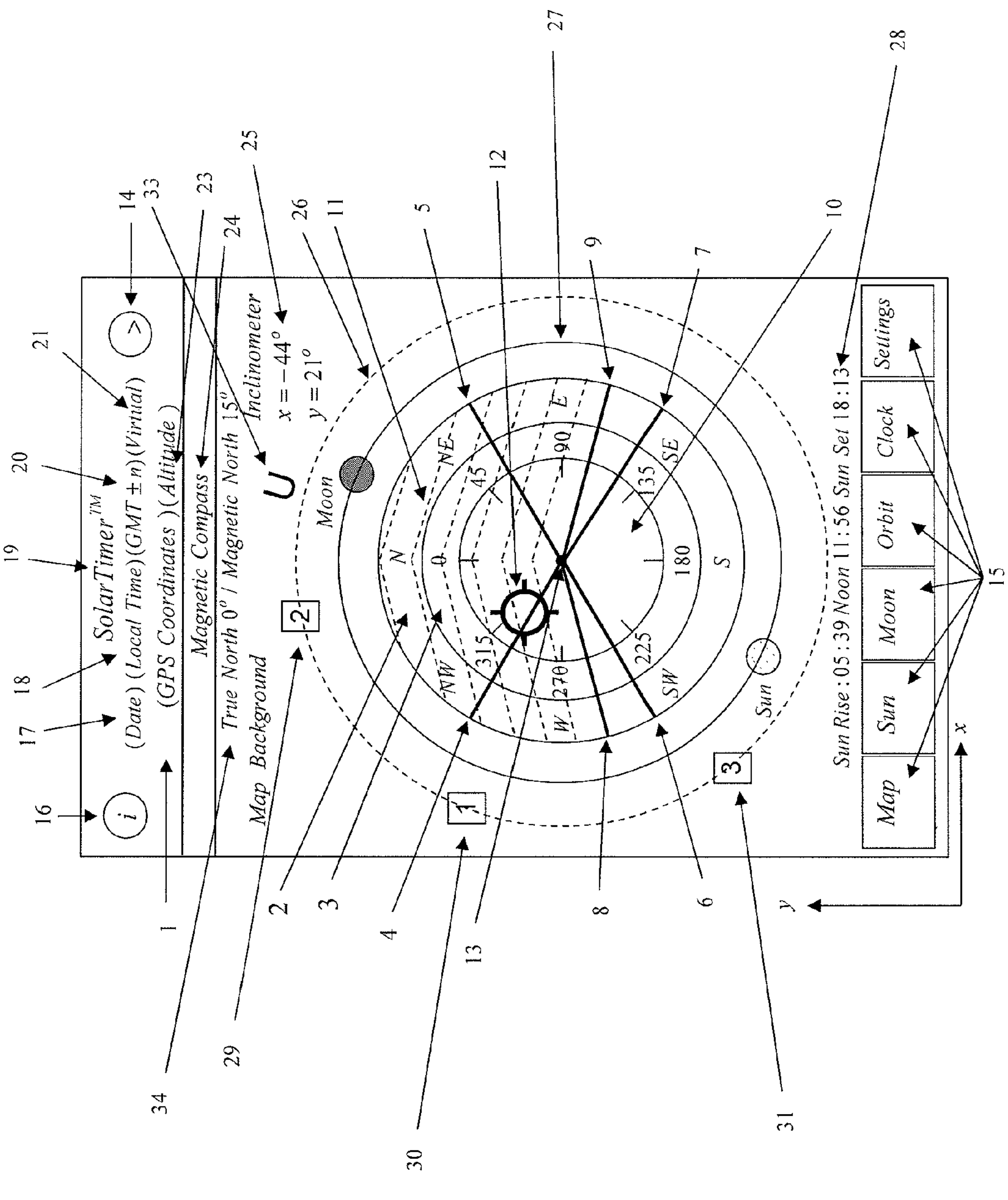
FIG. 3 is a line drawing representation of a display of a device according to the invention with a magnetic compass option enabled.

The header display area is located on top of the smart phone display as seen in FIGS. 2 and 3. In the center top of it the application a banner for program name may be displayed. The options button which is located on the upper right corner of the touch screen display of the smart phone is indicated as a common symbol of ">" as shown in FIG. 2.

Date and the Time Information Area

Beneath the banner is the date and the local time, which is given in the form of GMT±n (Greenwich Mean Time), where n is calculated from the GPS coordinates. The local time is obtained from the cell phone provider, which might have been adjusted with the day light savings time, is given outside of the banner display area at the very top where service and battery status is displayed. Along with this smart phone status information, cell phone provider information, the cell phone signal strength, Wi-Fi reception status, GPS receiver connectivity related information is given. Since the date and the time can be changed to any value desired it has to be distinguished if the displayed date and the time is current or virtual. If any one of the date or time is not current, there will be a comment as "Virtual" next to the displayed date and the time.

GPS Coordinates and Altitude Area

Beneath the date and the time display area is another data display line which shows the GPS coordinates and the altitude. The GPS coordinates can be changed by many means, such as typing a GPS coordinate or by moving on the world map manually or jumping to any location on Earth supported by the "Go To" commands. As is in the time since any place on Earth can be displayed on the map there is a need to show if the display is showing the current or virtual location. If the display shows a virtual or in other words other than current GPS coordinate, it will be commented as "Virtual" next to the displayed GPS coordinates. For virtual coordinates since there was no actual GPS reading the altitude can not be calculated. Therefore no altitude information will be displayed for the virtual GPS coordinates.

The Tool Bar Area

The "Tool Bar" is the area in the bottom of the touch screen of the smart phone with six icons as in FIG. 2. The icons from left to right look like the world map, Sun, Moon, Earth's Orbit around the sun and moon's orbit around the Earth, Clock and a gear symbol. By touching any one of these icons will either bring the user to another options menu for another choice of selection or if no other options are available it will display the information related to the selected icon from the tool bar.

Sunrise, Noon and Sunset Data Field in the Bottom Area

A single line of information display field is located on top of the tool bar which gives the times for sunrise, sunset and noon information. If the cursor is at current GPS coordinates and if the date is current the time for the sunrise, sunset and noon is given in terms of the local time obtained from the cell phone provider. For virtual GPS location or date, the time for sunrise, sunset and noon is the local time calculated in terms of GMT±n for the cursor GPS coordinates which is in the center of the compass dial. There might be a difference between the true local time due to daylight savings time (DST) adjustment.

With reference to the numerals in FIG. 2 and FIG. 3, the features of this display are as follows:

1. Cursor GPS Coordinates: Degree Minute Second or Degree Decimal Depending on the settings.

2. Compass Ring for Directional Abbreviations; Clockwise from the North N, NNE, NE, ENE, E, ESE, SE, SSE, S, SSW, SW, WSW, W, WNW, NW, and NNW.

3. Compass Ring for Angles from the North: Clock-wise from the north 0, 22.5, 45, 67.5, 90, 112.5, 135, 157.5, 180, 202.5, 225, 247.5, 270, 292.5, 315 and 337.5 Degrees.

4. Maximum Azimuth Angle for Sunset in a Year for the Cursor GPS Coordinates; a function of the cursor GPS coordinates that is calculated by the "OEA Astronomic and Navigational Computing Utilities" hereinafter outlined. This is not shown in Arctic or Antarctic regions because it overlaps with 5 below.

5. Minimum Azimuth Angle for Sunrise in a Year for the Cursor GPS Coordinates; a function of the cursor GPS coordinates that is calculated by the "OEA Astronomic and Navigational Computing Utilities". Not shown in Arctic or Antarctic regions because it overlaps with 4 above.

6. Minimum Azimuth Angle for Sunset in a Year for the Cursor GPS Coordinates; a function of the cursor GPS coordinates calculated by the "OEA Astronomic and Navigational Computing Utilities". Not shown in Arctic or Antarctic regions because it overlaps with 7 below.

7. Maximum Azimuth Angle for Sunrise in a Year for the Cursor GPS Coordinates; a function of the cursor GPS coordinates and is calculated by the "OEA Astronomic and Navigational Computing Utilities". Not shown in Arctic or Antarctic regions because it overlaps with 6 above.

8. Current Azimuth Angle for Sunset; a function of the cursor GPS coordinates and date that is calculated by the "OEA Astronomic and Navigational Computing Utilities". Not shown for dates which day or night length exceeds 24 hours.

9. Current Azimuth Angle for Sunrise; a function of the cursor GPS coordinates and date that is calculated by the "OEA Astronomic and Navigational Computing Utilities". Not shown for dates which day or night length exceeds 24 hours.

10. Clear Area for Day; a function of the cursor GPS coordinates and date. This is the clear region of the "Shaded Pie Circle" (shading not shown but is displayed. See below). It is the pie region defined between rays 8 and 9 in clock-wise direction (above) and shows the sweep angle for the sun from sunrise to sunset during the day and is calculated by the "OEA Astronomic and Navigational Computing Utilities". In Arctic or Antarctic regions for the dates that day length exceeds or equal 24 hours it covers 360°, i.e., all of the "Shaded Pie Circle".

11. Shaded Area for Night; a function of the cursor GPS coordinates and date. This is the shaded region of the "Shaded Pie Circle". It is the pie region defined between rays 9 and 8 in clock-wise direction (below) and shows the sweep angle for the sun from sunset to sunrise which corresponds to night during the 24 hour day and is calculated by the "OEA Astronomic and Navigational Computing Utilities". In Arctic or Antarctic regions for the dates that night length exceeds or equal 24 hours it covers 360°, or all of the "Shaded Pie Circle".

12. Inclinometer Circle; an analog means of showing the orientation of the smart phone or tablet with respect to the Earth's surface. If it is at the center, it means that the smart phone or tablet is parallel to the Earth's surface. It shows up when the magnetic compass option is used. It should be kept in the center for accurate magnetic compass readings.

13. Cursor Point; This is the center of the touch screen display. GPS coordinate reading from the map is done for the point which corresponds to the cursor point. It is stationary, the map moves!

14. Options Button; Touching the options button brings all the options available for any icon pressed from the tool bar below.

15. Tool Bar Icons; It is customizable by the user from the settings menu. There can be maximum of 6 icons displayed at one time. Each of the icons represents the related information that the user can request based on their appearance: Map, Sun, Moon, Orbit, Clock and Settings are the default settings. The user can select order or remove any one of them except the settings icon.

16. Info Button; Pressing it will bring the ownership of the SolarTimer, copyright, version related information.

17. Date; Gives the date in date, name of the month and Year format.

18. Local time; This information is obtained from the wireless network provider. It can be 24 hour military or 12 hour clock with AM/PM description settable by the user from the settings menu.

19. Program Banner; It is the identity of the application program "SolarTimer"™.

20. GMT±n Time; This is the local time in terms of the Greenwich Mean Time in other words UT (Universal Time). The device extracts the time information from the GPS, which is referenced to UTC (Universal Time Coordinated) as maintained by the USNO (United States Naval Observatory). Since the GPS time is related to the atomic oscillations, the UTC is probably the most accurate time available for the public. By merely knowing the GPS coordinates the local time can be calculated in terms of GMT or in other words UT. Therefore even if the cell phone or tablet is at a location with no Wi-Fi or cell phone reception GMT±n Time and date information is always available as long as there is GPS reception. The only issue left is if the local time is adjusted with the use of daylight saving time, for which there is no set standard. So there can be difference between the GMT±n Time and the "Local time".

21. Virtual Time; the device can calculate astronomical information for any date or time, past present or future. The time and date information for present is obtained from the GPS but can be changed to any value from the settings. If the present date and time is different than in the calculations the user will be will warned by displaying "Virtual" on the screen next to the GMT±n information.

22. Virtual GPS Coordinates; Since "OEA Astronomic and Navigational Computing Utilities" can calculate astronomical information at any place on Earth by several means, the similar issue as explained in 21 exists for the GPS coordinates and altitude. If the cursor GPS coordinates are different than the current, the user is warned by displaying "Virtual" on the screen next to the "Altitude" information.

23. Altitude; If the GPS can access four or more GPS satellites simultaneously it can calculate the altitude information relative to sea level for the current location. Therefore altitude information can only be given for the "current" location. When the cursor is at a virtual location the altitude cannot be calculated and is given as 0, if not set to a value from the settings menu.

24. Compass Option; Since the display and underlying software supports map, magnetic, solar, lunar, shadow and GPS compass options, the current compass option is displayed by the "Compass Option" field. The default compass option is the "Map Compass" option.

25. Numerical Values of Inclinometer Output; If the hardware of the device has an inclinometer or a three-axis accelerometer set, the numerical values of Inclinometer information is given along with the analog representation as explained in 12 above.

26. Target Display Circle; This circle displays the heading information for the selected targets or locations of interest. They are set-off or boxed numbers such as 1, 2, 3. If the cursor location is other than current, then the "home" symbol 32 will also appear on the target display which shows the heading from the virtual coordinate to the current GPS coordinate. With a double touch on the touch screen at any one of these locations on the target circle will give heading and distance to all other targets and current location on the screen displayed as a matrix notation. The locations of the object displayed in the Target Display Circle is a function of the cursor GPS coordinates.

27. Stellar Display Circle; This circle is for giving the azimuth angles for celestial or stellar objects such as sun, moon, planets. The default Stellar Display Circle merely shows the azimuth angles of the sun and the moon. The locations of the object displayed in the Stellar Display Circle are a function of the GPS coordinates, date and time.

28. Sunrise, Noon and Sunset Information; This display field shows the Sunrise, Noon and Sunset in terms of local time for the cursor location.

29. Target Heading Angle for Target #2; The heading angle referenced to the compass is given for going to the target #2 from the cursor GPS coordinates. By double touch to the touchscreen to this location all the heading and distance information to other targets, cursor point and the current GPS location is displayed.

30. Target Heading Angle for Target #1; The heading angle referenced to the compass is given for going to the target #1 from the cursor GPS coordinates. By double touch to this location the exact numerical value of all the heading and distance information to other targets, cursor point and the current GPS location is given.

31. Target Heading Angle for Target #3; The heading angle referenced to the compass is given for going to the target #3 from the cursor GPS coordinates. By double touch to this location the exact numerical value of all the heading and distance information to other targets, cursor point and the current GPS location is given.

32. Heading Angle for Home; The heading angle referenced to the compass is given for going to the current GPS coordinates from the cursor GPS coordinates. By double touch to this location the exact numerical value of all the heading and distance information to all targets and the cursor point is given. If the cursor is at the current location, this will not be displayed. Therefore the home symbol is always on the target circle when the cursor is at virtual GPS coordinates.

33. Magnetic North; This is the direction of the Magnetic North given by the magnetic compass hardware. It may be symbolized with a horseshoe magnet on the display. Since the magnetic north is not at the same location of the geographical north it is different than the "True North".

34. True North vs. Magnetic North; The true north is basically an information point that is obtained from the map data which is displayed on the touch screen and is lined up with the top x side of the smart phone or tablet as shown in FIG. 2. So even if it is assumed that the compass needle always points exactly to the magnetic north, the difference between the true north and magnetic north direction is related to the cursor GPS coordinates. As an extreme example, if the cursor (i.e., device location or virtual location) is between the line connecting the geographical north and the magnetic north there can be 180° difference between them.

The Map and its Functions

Displaying a map with current GPS coordinates superimposed on it makes navigation much easier. It also makes it more attractive to a user to relate to the point of references that can be seen visually to the map. The map display is also is used as a data input element to the application in the device, which increases its ease of use and capabilities.

A high resolution map data that covers the entire world would be massively large. Expecting the smart phone to contain all this massive data and having capabilities such as zoom, pan, move, rotate etc. is out of the question.

General Map Display Functions

The application supports different major smart phone operating systems, including the Apple iOS and Google Android. They have map functions supported by MKMapView and MapView for Apple iOS and Google Android operating systems respectively. They use Google Map functions [17]. As an example, the zoom functions support on the order of 22 levels. Almost all of the map functions—zoom, pan, go to, move on the map, rotate, acquire GPS coordinates, distance and bearing calculations to given GPS coordinate, display of compass on the map etc.—are done using the MKMapView and MapView which is accessed through a wireless (e.g., Wi-Fi) network as it exists in a large portion of urban areas and indoors.

In summary, the map data is not in the smart phone hardware; it is accessed through the Wi-Fi network, if available. Other alternatives are contemplated.

Generating Map Display where there is No Wi-Fi Coverage

Since one of the objectives is to give the application the capability to operate where the Wi-Fi access is not available, the user needs to pre-load map data to the smart phone beforehand to keep the application program active. This gives a somewhat limited capability in map display functions such as zoom, pan, move, etc., since it is limited to the pre-loaded map data. In the absence of Wi-Fi network access, only the stored area of the world map will be displayed, and all the zoom and pan functions will be supported for the stored area. This is far better than not showing any map at all due to the loss of Wi-Fi connectivity or its availability.

Choice of Maps and Compasses

There are three choices of maps supported: satellite, terrain and hybrid, which can be selected by the user in the settings. Maps also support the compass function by giving the map data facing north, which corresponds to the top end of the smart phone display. The compass option which comes with the map is called the "Map Compass". So in the default mode whenever a map is displayed the compass mode is set to "Map Compass" and the map view remain constant wherever the smart phone is rotated. The current compass option which is used is given in a highlighted area right under the header such as "Map Compass".

If from the compass options "magnetic compass" is selected, the map view changes, but it will still be presented referenced to the north but now the north direction becomes the compass north, not the top horizontal side of the smart phone. The map view will look the same if the top horizontal side is facing the true north. The current compass option used is given in a highlighted area right under a header such as "Magnetic Compass". Since magnetic north and the true north are different, a correction based on the current GPS location is made and true and magnetic north information is given right under the options line which is displaying "Magnetic Compass."

Since the smart phone or tablet computer magnetic compass reading is always current, if the GPS coordinates are virtual, displaying magnetic compass in virtual GPS coordinates is meaningless. Therefore whenever the current GPS coordinates are different than the cursor GPS coordinates the map display and the compass options are automatically set to "Map Compass" mode by the application.

Display Limitations

The map display functions are not supported for latitudes greater than 85 deg. North and 85 deg. South respectively. These areas can not be displayed due to projection issues related to the external mapping functions. Manually, one can get to these extreme latitudes by zooming in and moving until it is reached, but it is a cumbersome task. An easier path to these extreme latitudes is to enter it from the keyboard from the "Go To" menu option. Still they cannot be displayed on the map but the entered GPS coordinates will show on the touch screen display and will be taken into calculations as it appears.

The Analog Representation of GPS Coordinate, Date and Time Dependant Information on "Compass Dial"

As explained earlier, the GPS coordinate and date based calculated information can be massive. Some of the information can be displayed in an analog fashion on a conventional compass dial with some additional graphics that give a unique way of displaying a large amount of useful information which could be easily related to. This unique modified traditional compass dial is designated as the "OEA Compass Dial".

Utilizing the GPS functions in a smart phone, the current GPS coordinates, date and the time data are obtained [18]. The cursor GPS data could be also generated virtually which can be done basically four ways. The first method of generating virtual cursor location is basically typing the GPS Coordinates of the location of interest from the smart phone display keyboard. In the second method the GPS coordinates can come from a list of GPS coordinates, like an address book stored in the permanent memory of the smart phone. When the virtual cursor GPS coordinates are entered the map display will immediately change and the cursor will appear in the center of the display with the map showing the proximity of the cursor location.

The third and the interactive way of supplying virtual cursor GPS coordinates is by moving the cursor around on the displayed world map on the touch screen display of the smart phone with standard finger motions for move and zoom actions and selecting the desired GPS coordinates from the cursor location displayed on the map.

If the current GPS coordinates are far away from the location of interest the move can be cumbersome and can take many move, pan and zoom functions. This can be minimized by using the combination of selecting a location from the list which is close to the location of interest and then going to the desired location with a reduced number of move and zoom functions on the map which becomes the fourth method of moving the cursor to a virtual GPS coordinates.

Virtual entry of the date and the time is through the smart phone touch screen keyboard with a dialog box in the settings. Once the current or virtual GPS coordinates of the cursor, date and the time data is passed to the "OEA Astronomic and Navigational Computing Utilities", it will return a list of default outputs like the sun and moon's current elevation and azimuth angles, their maximum elevation angles at that day and their times. Their azimuth sweep angles for the day, sun and moon rise and set times and their azimuth angles, length of the solar day and the duration that the moon will be visible at that date are among other default output. In addition to these current and daily information related to a given GPS coordinates it will also return the maximum elevation angle for the sun and the moon during the year, the minimum and maximum azimuth angles for the sun and the moon rise and set, longest visible and invisible duration and their dates. It has to be noted here that after a certain higher and lower latitudes close to the poles which is defined as the Arctic and Antarctic Circles, the day or night can exceed 24 hours.

Some of the returned information from the "OEA Astronomic and Navigational Computing Utilities" can be represented on the "OEA Compass Dial" in analog fashion rather than only their numerical values superimposed on the selected map. In the center of the touch screen display is the "OEA Compass Dial" which as a default always gives the map compass, sun and moon's azimuth based on the cursor GPS coordinates, date and time. The cursor GPS coordinates displayed is taken from the center of the compass dial which is indicated with a yellow dot. All the information which is displayed by the compass dial is updated as the cursor moves on the map.

"Shaded Pie Circle", Day and Night Length and Azimuth Angles of the Sun at Sunrise and Sunset In the center of the Compass Dial is a pie chart that divides the 360° circle into two regions as shown in FIGS. 2 and 3 and in all the figures showing a compass dial. In the actual display a shaded, but still transparent, portion of the pie chart represents the night and the clear region represents the day light region at the GPS coordinate for the cursor which is the in the center of the "OEA Compass Dial" for the given date. Thus by merely looking at this analog representation the user can clearly relate the ratio of the day to night lengths very quickly. This analog representation of day and nigh is designated the "Shaded Pie Circle".

The beginning of the clear region to the right points to the compass angle for the sun at the sunrise. The end of the clear region at the left points to the compass angle for the sun at the sunset. These two angles are also known as the azimuth angle of the sun at sunrise and sunset. The sweep angle of the sun during the day for the GPS coordinates at the cursor at that date which is very clearly visible from this analog representation. After the sunrise, the sun appears to follow a path in the clockwise direction in the northern hemisphere and sets at the end of the transparent region.

The current azimuth angle of the sun and the moon is shown symbolically referenced to the compass dial on the display ring reserved for the stellar object ring with the correct phase of the moon designated "Stellar Azimuth Angle Display Ring".

As mentioned earlier, at and above the Arctic circle in the north and at or below the Antarctic circle in the southern hemispheres for certain dates the shaded region of the pie chart will either disappear or cover the inner circle entirely meaning that days or nights exceeding 24 hours. For these extreme conditions the sunrise, noon and sunset dates will be presented if requested.

"YMSA Lines", Yearly Minimum and Maximum Azimuth Angles of the Sun at Sunrise and Sunset; "the Cat Whisker Lines"

The "OEA Compass Dial" also displays the minimum and maximum sunrise and sunset azimuth angles throughout the year for the cursor GPS coordinate with four additional radial lines in two different colors in red and green respectively (not shown) as would be evident in a color rendition of FIG. 3. These radial lines are on the top and the bottom of the sunrise and sunset points displayed by the "Shaded Pie Circle". In short these lines will be referred to as YMSA (Yearly Minimum and Maximum Sunrise and Sunset Azimuth Angles). The YMSA lines along with the "Shaded Pie Circle" provide a very easy way to figure out what the current day length is compared to the yearly maximum and minimums. The ratio of the sun minimum and maximum sweep angles is also very clearly visible. In addition to that the current sweep angle of the sun and its relation to the YMSA lines gives also an idea of the season at that GPS coordinate.

FIG. 3 shows the "OEA Compass Dial" display (Magnetic) as it looks on a smart phone. Even without looking at the date, just from the shaded region position relative to the YMSA lines one can tell date is either mid autumn or mid spring.

These YMSA lines will not be generated when the GPS coordinates are in a location where yearly maximum and minimum day or night exceeds 24 hours, like in the Arctic and Antarctic regions as explained earlier. For these extreme latitudes if the day or night at that day exceeds 24 hours, the sunrise and sunset dates which, will be different than the current date will be given along with the sunrise and sunset times.

Calculations Required for Drawing the "Shaded Pie Circle" and "the Cat Whiskers"

"Shaded Pie Circle" as a shape and geometry looks very simple, just a shaded pie chart! But to calculate the shaded or un-shaded regions of the pie chart requires fairly complex calculations. The radial lines which define the boundaries of the shaded and unshaded regions of the pie chart are the sunrise and sunset azimuth angles at a given GPS Coordinates and date. These lines are calculated by using formulas given in Appendix A and are explained in detail in references [3-6]. As can be seen the formulations are not very simple. All of the needed formulations and the definitions of their arguments used in "OEA Astronomic and Navigational Computing Utilities" are given in Appendix A. As can be seen there are a large number of formulas which is needed in the calculations. The reason of putting all of them and their definitions entirely in Appendix A is to maintain the flow of the invention, which mainly is the "OEA Compass Dial" in this application. In this section we just give the computer flow diagram to show the formulas that must be used in sequence to draw the "Shaded Pie Circle" and the "CAT WHISKERS," which are very unique features.

The mathematical problem becomes finding the sunrise and sunset azimuth angles using the given GPS coordinates and the date. The next step becomes drawing the two radial lines referenced to north in the compass circle with the calculated azimuth angles and shading the portion which corresponds to the night time. If the difference between the sunrise and sunset azimuth angles is 360 degrees or larger, this corresponds to 24 hour daylight and there will be no shaded region. Obviously this corresponds to a geographical location above the Arctic Circle in northern hemisphere summer. The other possible alternative for the same situation is a geographical location below the Antarctic Circle in southern hemisphere summer.

Flow Chart 1 below explains all the computational steps required in the calculations of the sunrise and sunset azimuth angles using the given GPS coordinates and the date using the formulas given in Appendix A.

Flow Chart 1

Step 1. Calculate Sunrise and Sunset Time for current date and map position (formula 23-24).

Step 2. Calculate Sunrise and Sunset Time for 21 December (formula 23-24).

Step 3. Calculate Sunrise and Sunset Time for 21 June (formula 23-24).

Step 4. Calculate Sunrise and Sunset Angles for Step 1 (formula 29).

Step 5. Calculate Sunrise and Sunset Angles for Step 2 (formula 29).

Step 6. Calculate Sunrise and Sunset Angles for Step 3 (formula 29).

Step 7. Draw white pie graph in clockwise direction between Sunrise and Sunset points (for current date)

Step 8. Draw black pie graph in counter-clockwise direction between Sunrise and Sunset points (for current date)

Step 9. Draw green line between Center and Sunrise points (for 21 June)

Step 10. Draw green line between Center and Sunset points (for 21 June)

Step 11. Draw red line between Center and Sunrise points (for 21 December)

Step 12. Draw red line between Center and Sunset points (for 21 December)

If the given GPS coordinates are above the Arctic or below the Antarctic circles, then the longest day and night will be longer than 24 hours and there will be no need for any calculation for the "Cat Whisker" lines. This looks good in terms of computation, but it also means that the sunrise or sunset dates have to be found. This might require long computation times because the start point will be the current date and time and from there on the elevation angle for the sun has to be calculated until it becomes zero degrees both direction in time. The sunrise or sunset dates is very sensitive to the errors in the calculations.

Flow Chart 2 below explains all the computational steps required in the calculations of the sunrise and dates for the given GPS coordinates using the formulas given in Appendix A.

Flow Chart 2

Step 1. Set date to first day of selected year.

Step 2. Calculate Noon time for date. (formula 22)

Step 3. Calculate Noon Elevation Angle of Sun for Step 2. (formula 30)

Step 4. If (date=first day of selected year) then Go to Step 7

Step 5. If (tempElevationAngle*Noon Elevation Angle) <=0.0 and tempElevationAngle >=0.0 then set sunsetDate to date.

Step 6. If (tempElevationAngle*Noon Elevation Angle) <=0.0 and tempElevationAngle <0.0 then set sunriseDate to date.

Step 7. Set tempElevationAngle to Noon elevation angle of sun.

Step 8. If (date=last day of selected year) then Go to Step 11.

Step 9. Add one day to date.

Step 10. Go to Step 2.

Step 11. Exit

The Cursor and the Conventional Compass Rings

A conventional compass dial generally is shown as two concentric rings with letters and numbers written in them. In this instance, the compass dial maintains this convention with an identifiable center point, which corresponds to the curser point for example indicated as a yellow dot. The GPS coordinates displayed in the top numerical display are the GPS coordinates of this yellow cursor point along with the time and date information. Since these GPS coordinates can be current or virtual as explained earlier this is identified as virtual if it is not current.

The inner ring gives the directional angle information in numbers from 0 to 360 degrees with 22.5 degree increments which divides the circle to 16 equal direction segments. The outer ring gives the abbreviation of the main directions North, South, East and West as N, S, E and W respectively. Their angle equivalents of are 0, 180, 90, 270 degrees respectively. The mid-points between the main directions are abbreviated as NE, NW, SE and SW. They represent North East, North West, South East and South West corresponding to 45, 315, 135 and 225 degrees respectively. There is just enough space to write two more mid point angle and abbreviations which are 22.5, 67.5, 112.5, 157.5, 202.5, 247.5, 292.5 and finally 337.5 degrees. Their abbreviations are NNE, ENE, ESE, SSE, SSW, WSW, WNW and finally NNW respectively. Anything more than this crowds the compass dial of this scale with unreadable information.

In navigation the heading or any angle direction is given in degrees in clock wise direction of rotation from the north, if not specified otherwise. When an angle such as 90 degrees is given it means rotating clockwise from the north giving easterly direction, 270 degrees means west and 180 degrees corresponds to south.

"Stellar Azimuth Angle Display Ring" for the Azimuth Angle of the Sun and Moon

There is another data display ring area with a larger radius than the outer ring that shows the sun and moon's azimuth angle symbolically. This ring is designated "Stellar Azimuth Angle Display Ring". As default only the sun and the moon are shown, but a user can add more stellar objects such as other planets. Limiting these to a reasonable number is a good practice due to information clutter.

The "Inclinometer Circle"

The x axis of the smart phone is defined as the bottom edge of the screen or the edge closest to the user when held in normal holding position, which is also known as the width or horizontal direction of the smart phone. The y axes is in the left side of the smart phone screen perpendicular to the x axis and also known as the height or vertical direction.

Some of the smart phones have accelerometers that give the inclination angle of the smart phone. If this function is supported, there will be another circle drawn in white and twice the size of the cursor point with four tick marks displayed on the touch screen. If the smart phone is held flat, this inclination circle will be at the center of the compass dial surrounding the cursor point. The numerical values of the inclination angles with respect to the x and y axes of the smart phone are displayed under the "Inclinometer" heading in degrees at the upper right portion of the Compass Dial touch on top of the tool bar (drawn in white, the same color as the inclination circle).

Many smart phones have magnetic compass capabilities. This capability is provided by electronically measuring the direction of the magnetic field of the Earth rather than a magnetic needle as in a conventional magnetic compass. This magnetic compass capability performs the magnetic compass function with static electronic means. If the smart phone has magnetic compass capabilities it is a good practice to hold the smart phone horizontal when using the magnetic compass utility. The inclinometer output is very useful information for this use. A schematic view of the display with the inclinometer angle at an non zero position is shown in FIG. 3.

Another use of inclinometer output is to obtain a physical feel of the calculated elevation angles. By looking at the inclinometer reading the smart phone can be oriented with the calculated elevation angles without physically aiming to the sun or the moon.

"Target Display Ring"

Some applications require the GPS coordinates, of which some can be named as targets, destination points or favorite locations. There is no limitation to the number of target selections. The target GPS coordinates can be generated many ways, for example by typing any desired GPS coordinate or by interactively moving on the map and designating the desired points on the map and inquiring their GPS coordinates from it.

For the same reason as explained in "Stellar Azimuth Angle Display Ring", crowding the "Target Ring Display" generates display clutter. Therefore a maximum of eight of selected target heading information should be displayed, which is user selectable from the list of targets.

If the cursor is a virtual point on the map the target display will also have a home symbol which shows the heading and distance information to the current GPS coordinates with no additional work.

The heading and distance information between two points on the map is calculated along the Earth's great circle passing from the two GPS coordinates. If the target/destination or favorite location coordinates are in the display window of the map, they will be shown as wherever they are on the map. Those outside the map display area will be placed on the "Target Ring" according to their calculated heading information.

The distance and heading information from the cursor location on the map to the targets and the current location, which is displayed with a home symbol, can be obtained by selecting any target symbols on the display. The information is given in matrix form which gives distance to the selected target and the heading information from the cursor location and distance and heading information between targets are given with a pop up display.

Targets can also be marked with religious symbols and their GPS coordinates such as Kabe, Jerusalem or The Vatican.

Summary of the Information Given by the Compass Dial

As can be seen the analog Compass Dial provides much useful information to the user in a form which is very easy to understand. Humans comprehend and relate to analog information much more quickly and easily than numeric or digital information. (This is the main reason dial type instrumentation are always preferred in critical displays even they are numerically calculated values. A very good example to this can be seen in the cockpit information in planes are presented always in analog fashion. Even in simple every day application like in watches displaying the time in an analog fashion is far easier to comprehend compared to the numerical value of the time.

The information the user can grasp with a single glance to the Compass Dial at cursor GPS coordinates can be listed as:

Current azimuth angle of the sun
Current azimuth angle of the moon
Phase of the moon
Azimuth angle at sunrise
Azimuth angle at sunset
Analog view of day and night ratio at that date
Analog view of the sun sweep angle for the day
Analog view of the night
Analog Minimum azimuth angle for the sunrise during the year
Analog Minimum azimuth angle for the sunset during the year Analog Maximum azimuth angle for the sunrise during the year Analog Maximum azimuth angle for the sunset during the year Analog view of the longest day to current day length relation Analog view of the shortest day to current day length relation Analog view of the shortest night to current night duration relation Analog view of the longest night to current night duration relation Approximate season information Location on the map Heading information to the targets Distance to the targets Heading information between targets Distance between the targets Variety of compass information In addition, if the cursor is at a virtual GPS coordinate, the following information can be displayed:

Heading information from the cursor point to the current GPS coordinate

Distance information from the cursor point to the current GPS coordinate

In addition to all these, their relative proportional relations come as a bonus. If all this information was given as 25 individual numerical value displays it would make little sense to anyone at a short glance.

The Compass Dial is an active display that changes with time, even kept stationary and is only possible with very fast and accurate calculations provided by the "OEA Astronomic and Navigational Computing Utilities".

Map Display as a GPS Coordinate Input Device

The user can designate a single or multiple targets or destination coordinates by moving on the selected map with standard touch actions which are standard in any touch screen smart phone. During the move on the map zoom functions are supported with standard touch and slide actions to the touch screen done by fingers. As the cursor point on the compass moves on the map, so does the GPS coordinates. These changing GPS coordinates become the changing input of the "OEA Astronomic and Navigational Computing Utilities". When GPS coordinates change, the calculated sun and moon's elevation and azimuth angles change for the same GMT too. Since the Compass Display is active during the move and the calculations are done in real time speeds, it shows the sun and moon's position looks like an animation, changing the way it looks as the cursor moves on the map.

Moving Around the Map

The application supports zoom in and out on any map, which is displayed with standard sliding finger motions applied to the touch screen. The user can go anywhere on Earth virtually limited only by the display capability of the displayed map. The cursor GPS location is always updated as it is moved around on the map.

The changing shaded area of the pie slice, all of the 6 lines drawn radially from the cursor to the compass rings along with the sun and moon's and target positions in the Compass Display become a function of time looking like an animation of a bird flapping its wings in the center of rotating symbols as the cursor moves on the map.

Accessing all of the Calculated Information from the Tool Bar Icons

Map Icon

This icon comes highlighted as the default view. When the options button ">" on the "Header Display" area is pressed the screen will display two groups of icons to select from.

Compass Modes

The application has Map, Stellar, Magnetic and a novel GPS Compass options. Due to the movement of the magnetic poles and the local anomalies in the Earth's magnetic field, a magnetic compass can give wrong readings in certain regions. For a magnetic compass to give accurate directional information, it must be calibrated with magnetic declination information for that GPS coordinate. Magnetic declination also changes with time for a given GPS coordinate. Therefore there are government organizations that provide the up-to-date magnetic declination information that is updated at least every six months. Having 5 other compass options the user can perform magnetic declination calibration anywhere on Earth, anytime, without accessing these government organizations. By comparing the true north obtained from other compass options the magnetic compass magnetic north reading can be adjusted to display true north. For this purpose multiple compass options are supported in one compass dial, and the differences can be seen on the same compass dial for easy adjustment.

The multiple compass options are very useful in the vicinity of the magnetic poles. The majority of the magnetic fields' magnitude close to the magnetic poles is due to its radial component. On the other hand the magnetic compass points to the magnetic north because of the tangential component of the Earth's magnetic field, which is very weak in the vicinity of the magnetic poles. The compass needle will dip downwards towards the Earth's interior at and near the magnetic poles due to the strong radial component of the Earth's magnetic field. Since the tangential component of the Earth's magnetic field is very weak, the magnetic compass needle will only turn due to the external, other than the Earth's magnetic field, basically making the magnetic compass useless in those regions. Having other compass options makes navigation possible anywhere on Earth with this application.

The compass modes are the following:

Map Compass

The default compass mode is the map compass which is obtained from the map with map functions provided. If the smart phone supports magnetic compass function map option also displays the magnetic north with a symbol as a horse shoe magnet, obtained from the smart phone magnetic compass hardware corrected with the current GPS location and the magnetic north information.

Magnetic Compass

If the smart phone supports magnetic compass function this selection of this icon allows the compass dial to display the magnetic compass. The display will also write the numerical values of true north and the magnetic north. This does not take the local magnetic anomalies into account, it is a correction just based on the magnetic pole and current GPS coordinate information.

Stellar Compass

This option has basically three Solar, Shadow and Lunar Compass options to choose from.

Solar Compass

Knowing the date and very accurately the time along with the GPS Coordinates the sun's elevation and azimuth angle is very precisely calculated and displayed in the OEA compass dial. In this mode the OEA compass dial is based on the sun's current azimuth angle. This is a very accurate compass dial, as accurate as the user can point and aim to the sun, showing the true north along with the magnetic compass reading. The difference between the Solar Compass north and the displayed "True North" from the magnetic compass reading gives the local magnetic declination adjustment. The user selects this option by pressing the sun button and basically points the smart phone to the sun and the compass dial will be oriented give the correct direction.

Lunar Compass

At night since the sun is not visible, the same true north information can be calculated by the azimuth angle of the moon. In this mode the user points the smart phone to the moon and the application generates a compass dial based on the moon's azimuth angle. This has the same accuracy as the Solar Compass mode which could be used for the local magnetic declination adjustment. The user selects this option by pressing the moon button and basically points the smart phone to the moon and the compass dial will be oriented give the correct direction.

Shadow Compass

This is the opposite of the Solar Compass. Sometimes pointing to the sun is very difficult on the eyes. The shade of an object which is perpendicular to the ground might give an easier option in the field. In this mode the user points to the sun's shadow of the object on the ground and a compass dial referenced to the shadow gives the very accurate true north information which could be used for the local magnetic declination adjustment. The user selects this option by pressing the shadow button and points the smart phone in the direction of a shade of an object and the compass dial will be oriented give the correct direction.

GPS Compass

If the sun and the moon are not visible then there is a very unique capability in the application designated the GPS Compass. In this mode the user is asked to perform some instructions given by the "GPS Compass" program, requiring some movement or translation (walking) and taking GPS coordinate readings, all done automatically, which will give an accurate compass dial anywhere any time.

Pressing the GPS Compass button brings the display with a compass and three windows Target, Reference and Mark Points respectively. The window is divided in to two row and two column display sections.

GPS Compass Principle

The basis of the GPS Compass is defining a "Reference Line" and relating the directions to a desired target referenced to it. The "Reference Line" becomes equivalent to the traditional compass needle, and the target direction will be calculated taking the reference line as the reference direction. To define a line, two points are needed. In this case these are called the "Reference Point" and the "Mark Point". The "Reference Line" can be in any direction but the angle errors are related to its length and its orientation with respect to the target coordinates. To have a reasonable accuracy in any direction and target coordinates, the distance between the "Reference" and "Mark" points has to be in the order of 200 meters or greater.

The user defines a "Reference Point" by recording the GPS coordinates of it (based on readings from several satellites equipped with GPS transmitters by just pressing a button on the GPS compass display and then moves away from it. When far enough, GPS Compass will indicate that the distance from the reference point is suitable for giving accurate enough directional information to the selected target referenced to the reference line. The user than turns and points the device, namely the smart phone, toward the "Reference Point" and records the current GPS coordinate as the "Mark Point", again by just pressing a button on the GPS compass display. After entering the GPS coordinates of the Target, the GPS Compass software will calculate the angle that user has to turn to point to the target. GPS Compass will also generate a compass dial with traditional symbols such as North, South, etc. referenced to the reference line pointing towards to the "Reference Point".

In principle, walking a distance in the order of 200 meters and pressing 2 buttons and entering a target GPS coordinate yields a compass capability to anyone with a commercial grade GPS equipped with some computing capabilities anywhere, anytime on Earth with a consistently reasonable accuracy. Since the required hardware is available in a smart phone this technique is utilized with a simple user interface.

After 200 meters of distance between the Reference and Mark Points, majority of the errors are due to aiming error to the "Reference Point" from the "Mark Point" and errors made during turning towards to the target which really depends on the user but is expected to be less than 6 degrees.

GPS Compass Application Display

The top left region has a compass dial. In the bottom row there are 2 identical data entry windows named "Reference Point" and "Mark Point". They have data fields for latitude and longitude, with three icons underneath them. The icons are the yellow node pad which corresponds to the "Location" in the main menu display, "map" and a "parabolic antenna" which symbolizes the GPS as shown in FIG. 5.

Figure 4B:
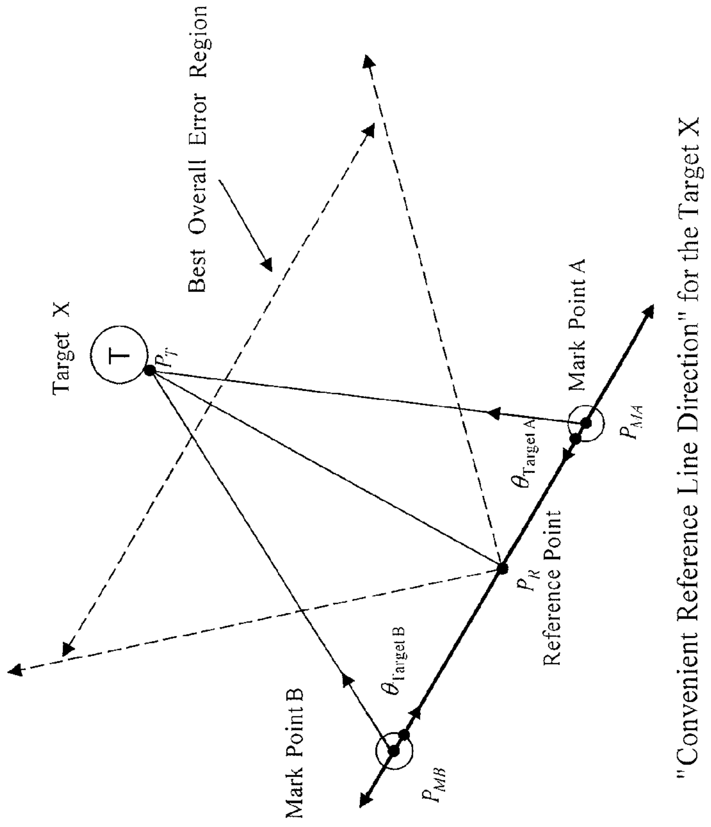
FIG. 4B is a diagram illustrating reference line selection—folded.
Figure 4A:
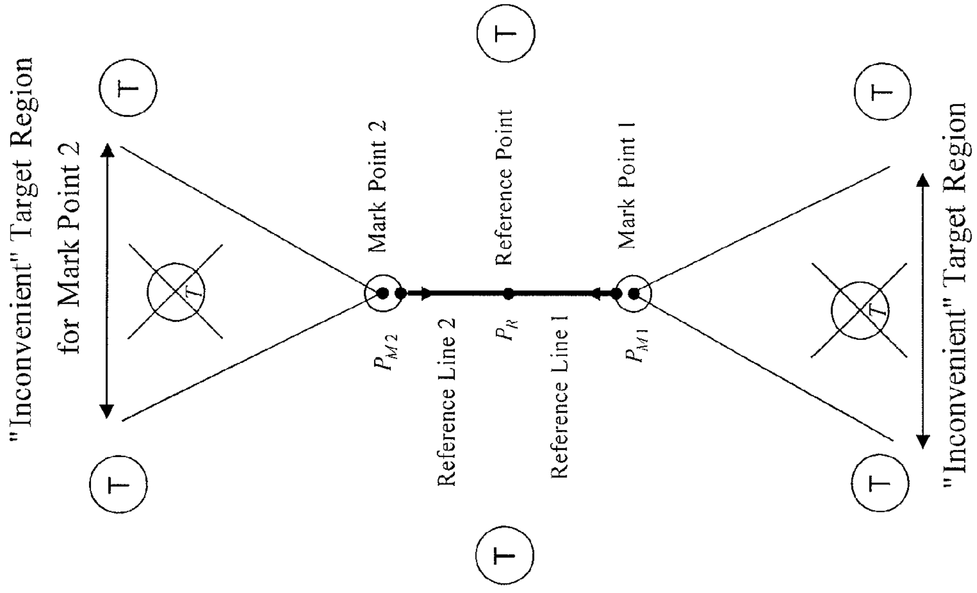
FIG. 4A is a diagram illustrating reference line selection—unfolded.

On the top row, next to the compass there is a data entry window named "Target". The data entry window looks the same as "Reference Point" and "Mark Point" data entry windows with an additional data display line in the bottom giving the calculated turning angle when facing the "Reference Point" from the "Mark Point" in clock-wise direction and distance to the target side by side. FIG. 4A and FIG. 4B illustrate an unfolded and folded characterization of the Mark Point, Reference Point and Target, as hereinafter explained.

Selecting the Reference Point

The first step is defining a convenient place for the "Reference Point". The "Mark Point" will be somewhere in a circle with a radius in the order of 200 meters where the center of the circle is at the "Reference Point". Ideally the reference point is selected such that the user can move freely and maintain good visual contact with the reference point in the order of 200 meters. Once selected, the reference point GPS coordinates is entered by touching the parabolic antenna icon in the GPS Compass window under the "Reference Point" window. Once pressed the current GPS coordinates of the reference point will be displayed in data fields next to latitude and longitude in the "Reference Point" window.

In the actual GPS Compass application, this is the only action required. The other two icons are for a "Virtual GPS Compass" application.

Selecting the "Mark Point" after "Target Coordinate" Information

After defining the "Reference Point" the user can walk away in any direction from the "Reference Point" to define the "Mark Point". Knowing the target coordinates allows GPS compass to give a "Convenient Reference Line Direction" to the user which minimizes the calculated absolute and average angle errors, as well as giving smaller turning errors due to the better orientation of the "Reference Line" to the target coordinates. This is illustrated in FIGS. 4A and 4B In this mode the user enters the target coordinates. There are three options for doing so in the GPS Compass "Target" data entry window using the three icons, which are the yellow node pad that corresponds to the "Location" in the main menu display, the "map" and a "parabolic antenna" which symbolizes the GPS as shown in FIG. 5.

i) Location Icon

If the target is already in the "Location" address book indicated as the yellow note pad the user touches the "Location" icon. This brings the "Location" display window. By scrolling up and down finds the target from the list. Touching any line will highlight it. After finding the line corresponding to the target user touches it and it will be highlighted and selects the highlighted line by touching the "Done" button at the lower right. This action will grab the GPS coordinate of the selected location and it will be displayed in data fields next to latitude and longitude in the "Target Point" window. So in this mode no typing is required.

ii) Map Icon

If the target is identifiable on the map user selects the "map" icon. With standard finger motions supported in the map functions moves and zooms to the target location. The cursor GPS coordinates are always given in the "Header Display" and the SolarTimer Compass Dial always active during the move. Once satisfied with the map location the user goes back to the GPS Compass window. The cursor GPS coordinates will be displayed in data fields next to latitude and longitude in the "Target Point" window. At this point the user can enter the cursor coordinates to the "Location" so if this GPS coordinate is going to be used frequently it will be there and can be accessed without moving and zooming on the map.

iii) Keyboard Entry

If the target GPS coordinates are known exactly then the user touches the data field next to latitude and longitude. Once the data field next to the button for latitude and longitude is pressed the standard smart phone keyboard will appear which partially covers the touch screen. The user fills in the latitude and longitude information by typing in the desired information using the keyboard displayed on the screen. After finishing, one touches the "Done" button at the lower right of the keyboard display.

Once the target coordinates are entered, the GPS Compass will display a line on the map corresponding to the "Convenient Reference Line Direction." In the middle of it there is a marker like a pin indicating the "Reference Point" which is the current location of the user. The line is drawn toward the target location.

Air Mass

Air Mass is an important variable in determining the maximum available solar power density calculations. The secant of the angle between the sun and the zenith is called the "Air Mass" (AM) and measures the atmospheric path length relative to the minimum path length when the sun is at 90 degrees of elevation. In the calculations the Earth's curvature is taken into consideration. As an example, AM0 corresponds to solar radiation power density at the upper atmosphere with no attenuation giving 1353 $W/m^2$. AM1 corresponds to sun at 90 elevation angle giving 925 $W/m^2$ on the Earth's surface. AM1.5 corresponds to sun at 45 degrees of elevation angle giving 844 $W/m^2$ and AM2 corresponds to sun at 30 degrees of elevation angle giving to 691 $W/m^2$ on the Earth surface [19].

Incoming Solar Power Density

Using the air mass number calculated, the incoming solar power density is calculated and displayed. In the calculations the solar cell is assumed to be always perpendicular to the sun's rays, in other words power density calculations is for a perfect sun tracking solar cell.

Pseudo Code

Since much of the present invention lies in the information presentation features of the display, it is useful to present in pseudo code form at least some of the display instructions. This pseudo code may be translated into a computer language suited to the physical platform and operating system, where the physical platform supplies the sensed parameters, such as radio signals and device orientation, and the operating system provides the interface between the user, the input and output elements and the application program that constitutes the utilities.

```
  { Finds the point on the circle according to given parameters }
Procedure GetPointOnCircle(angle:double, radius:double, centerPoint:Point)
Begin
  pointX := radius * sin(angle) + centerPoint.X
  pointY := radius * cos(angle) + centerPoint.Y
End
  { Draws the pie circle according to given parameters }
Procedure DrawPie(centerPoint:Point, radius:double, strAngle:double, endAngle:double)
Begin
  { Find pie parameters }
  diffAngle :=endAngle – strAngle
  stepAngle := diffAngle * 72 .0 / 360.0
  incAngle = diffAngle / stepAngle
  { Create polygon points }
  Add centerPoint to Polygon
  for i:=0 to stepAngle
  begin
    currentAngle := strAngle + (i * incAngle)
    currentPoint := GetPointOnCircle(currentAngle, radius, centerPoint)
    Add currentPoint to Polygon
  end
  Add centerPoint to Polygon
  { Fill Polygon }
  Fill polygon using current pen color
End
```

-continued

```
  { Draws the Compass Dial according to given parameters }
Procedure DrawCompassDial(dateTime:DateTime, gpsLocation:GPSLocation)
Begin
  { Calculate center point }
  centerPoint := Calculate center point using width and height
  { 1. Analog Compass Display Ring }
radiusCompass := Screen Width * 0.25
Show Analog Compass image in radiusCompass
{ 1.1. Calculate sunrise and sunset time }
  Calculate sunrise and sunset times for dateTime and GPS Location using "OEA
Astronomic and Navigational Computing Utilities"
  Calculate sunrise and sunset times for 21 Dec using "OEA Astronomic and
Navigational Computing Utilities"
  Calculate sunrise and sunset times for 21 Jun using "OEA Astronomic and
Navigational Computing Utilities"
  { 1.2. Calculate sunrise and sunset angles }
  Calculate sunrise and sunset angles for dateTime and GPS Location using "OEA
Astronomic and Navigational Computing Utilities"
  Calculate sunrise and sunset angles for 21 Dec using "OEA Astronomic and
Navigational Computing Utilities"
  Calculate sunrise and sunset angles for 21 Jun using "OEA Astronomic and
Navigational Computing Utilities"
{ 1.3. Draw "Shaded Pie Circle" for current date }
  Set pen color to white
  DrawPie(centerPoint, radiusCompass, sunriseAngleCurrent, sunsetAngleCurrent)
  Set pen color to black
  DrawPie(centerPoint, radiusCompass, sunsetAngleCurrent, sunriseAngleCurrent)
  { 1.4. Draw sunrise and sunset lines for 21 Jun }
  Set pen color to green
  sunrisePoint := GetPointOnCircle(sunriseAngle21Jun, radiusCompass, centerPoint)
  sunsetPoint := GetPointOnCircle(sunsetAngle21Jun, radiusCompass, centerPoint)
  Draw line between center and sunrise points
  Draw line between center and sunset points
```

The "OEA Astronomic and Navigational Computing Utilities" program set is available under license from OEA International Inc., Morgan Hill, Calif. Selected explanation of the utilities is found in appendices.

Different arrangements of the components depicted in the drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to those of ordinary skill in the art to which this invention pertains. Accordingly, the present invention is not limited to the embodiments described above or depicted in the drawings, and various embodiments and modifications can be made without departing from the scope of the claims below.

APPENDIX A

Formulations and Definitions Used in the "OEA Astronomic and Navigational Computing Utilities"

The utility set uses formulas for sun and moon's elevation and azimuth angle calculations. There are publications on the subject [3-6].

1.0. Sun Tracking Fundamentals

The basics of the algorithms are fairly simple. The Earth rotates around the sun with an orbit which can be defined mathematically. In addition to that it also rotates around it self around rotational axes, which has an inclination angle to the orbital plane. For now let's assume the inclination angle and the Earths orbit around the sun does not change with time. If the period for Earth's rotation around the sun and its rotation around its own rotational axes are constant and both can be related to a well defined time base one can precisely calculate the sun elevation and azimuth angle at any time and place on Earth. It is not very simple, but at the end it is straightforward geometry which should involve some basic trigonometric functions.

Since there are bodies like moon and other planets in the solar system which also have periodic motions around the sun, it is just normal to expect the Earth's orbit around the sun and its inclination angle of the Earth will be affected by their presence. Taking these secondary effects we can still conclude that the Earth's orbit around the sun and the inclination angle changes periodically with a small amount. If we know these periodic changes and can include these in to the calculations as well, than one can calculate the sun's elevation and azimuth angles at any time and place on Earth precisely. Since all of the changes are periodic, the predictions of elevation and azimuth angle of the sun at any location on Earth at any time, past or future can be made with the same accuracy!!

The algorithms take into consideration of all the known periodic motions of the Earth. These include the following periodic motions which effect the suns elevation angle at a given geographical location and date.

1.1. "Wobbling" of Earth's Axis of Rotation

Earth's rotation axes presently points towards the distant star Polaris as shown in Figure [A1]. Due to the gravitational perturbation of other bodies in the solar system, especially the moon, effects the rotation of the Earth. Basically there are two types of perturbation with different periods.

1.1.1. Axial Nutation

Rotational axes of Earth bobs up and down by 9.18" with a period of 18.6 years. This is a small effect but it is included in the algorithms.

1.1.2. Axial Precession.

Earth's axial tilt oscillates from 22 to 24.5 degrees and back every 41,000 years. The Earth's axes of rotation itself, rotates clockwise direction on a circle centered on the ecliptic axes with a period of 25,700 years. This is a large but very slow effect and it is the cause of slipping of the seasons counter-clockwise along the Earth's orbit around the sun.

1.2. Periodic Changes in the Earth's Orbit Around the Sun

The time of year (season) at the point in Earth's orbit where the planet is closest to the Sun varies with cycles of 19,000 and 22,000 years. This is the "precession of the equinoxes".
Earth's elliptical orbit is characterized by eccentricity. This varies from 0.0 (nearly circular) to be more elliptical with a period of 95,000, 136,000 and 413,000 years.
These periodic variations are known as Milankovich Cycles [26] and are well formulated and included in the elevation calculation algorithms. Let's briefly talk about the Milankovich theory.

The Milankovich Theory

The Earth's orbit is not perfectly round but slightly elongated. The Earth therefore comes closest to the sun in the first week of January (the exact day varies a little). It means that just when the northern hemisphere experiences winter and receives the least amount of sunlight, the Earth as a whole receives the most (the swing is about 3%, peak to peak). This makes northern winters and northern summers milder, since they occur when the Earth is most distant from the sun.

The opposite is true south of the equator: the beginning of January occurs there in summer, and therefore one expects southern summers to be hotter, and southern winters colder, than those north of the equator. This effect is however greatly weakened, because by far most of the southern hemisphere is covered by ocean, and the water tempers and moderates the climate. Right now, northern winter occurs in the part of the Earth's orbit where the north end of the axis points away from the sun. However, since the axis moves around a cone, 13,000 years from now, in this part of the orbit, it will point towards the sun, putting it in mid-summer just when the Earth is closest to the sun as illustrated in Figure [A3].

At that time one expects northern climate to be more extreme, and the oceans then have a much smaller effect, since the proportion of land in the northern hemisphere is much larger. Milankovich argued that because winters were colder, more snow fell, feeding the giant glaciers. Furthermore, he said, since snow was white, it reflected sunlight, and with more severe winters, the snow-covered land warmed up less effectively once winter had ended. Climate is maintained by a delicate balance between opposing factors, and Milankovich argued that this effect alone was enough to upset that balance and cause ice ages.

Milankovich was aware that this was just one of several factors, since it turns out that ice ages do not recur every 26,000 year, nor do they seem common in other geological epochs. The eccentricity of the Earth's orbit, which determines the closest approach to the sun, also changes periodically, as does the inclination of the Earth's axis to the ecliptic. But overall the notion that ice ages may be linked to the motion of the Earth through space may be currently our best guess concerning the causes of ice ages [23].

Terrestrial Coordinates

In section 1.0 some basics about the factors affecting the periodical motion of the Earth and its inclination angle on the orbital plane around the sun is briefly explained. Since we need to relate a time base to these periodical motions to the Earth's rotation around it rotational axes we have to talk about the methodology in defining a coordinate system on Earth as well.

A great circle is an imaginary circle on the surface of a sphere whose center is the center of the sphere. Great circles that pass through both the north and south poles are called meridians, or lines of longitude. For any point on the surface of Earth a meridian can be defined.

The prime meridian, the starting point measuring the east-west locations of other meridians, marks the site of the old Royal Observatory in Greenwich, England. Longitude is expressed in degrees, minutes, and seconds of arc from 0 to 180 degrees eastward or westward from the prime meridian. This is illustrated as a flat view of the Earth in Figure [A3]. For example, downtown Pasadena, California, is located at 118 degrees, 8 minutes, 41 seconds of arc west of the prime meridian: 118° 8' 41" W.

The starting point for measuring north-south locations on Earth is the equator, a great circle which is everywhere equidistant from the poles. Circles in planes parallel to the equator define north-south measurements called parallels, or lines of latitude. Latitude is expressed as an arc subtended between the equator and the parallel, as seen from the center of the Earth. Downtown Pasadena is located at 34 degrees, 08 minutes, 44 seconds latitude north of the equator: 34° 08' 44" N.

Throughout the history of navigation, determining one's latitude on the Earth's surface has been relatively easy. In the northern hemisphere for example, simply measuring the height of the star Polaris above the horizon results in a fairly close approximation of one's latitude. Measurement of longitude, however, has been a historically significant endeavor, since its determination requires portable and accurate timekeeping. John Harrison [25] (1693-1776) eventually succeeded in developing a chronometer good enough to do the trick.

One degree of latitude equals approximately 111 km on the Earth's surface, and by definition exactly 60 nautical miles. Because meridians converge at the poles, the length of a degree of longitude varies from 111 km at the equator to 0 at the poles where longitude becomes a point.

2.0. The Terminology and Definitions Used in the Mathematical Formulation of Sun the Tracking

The Earth's Orbit Around the Sun

According to the Kepler's first law, the Earth's trajectory around the sun is an ellipse with the sun being at one of its focal points.

The point of the Earth's orbit that is the closest to the Sun is called the perihelion while the aphelion is the point that is farthest from the sun. As shown in Figure [A4] "a" is half of the major axis and "b" is half of the minor axis. The shape of the ellipse is then characterized by its eccentricity.

Orbital Elements

The elements of an orbit are the parameters needed to specify that orbit uniquely, given a model of two point masses obeying the Newtonian laws of motion and the inverse-square law of gravitational attraction. Because there are multiple ways of parameterizing a motion, depending on which set of variables you choose to measure, there are several different ways of defining sets of orbital elements, each of which will specify the same orbit.

This problem contains three degrees of freedom (the three Cartesian coordinates of the orbiting body). Therefore, any given Keplerian (unperturbed) orbit is fully defined by six quantities - the initial values of the Cartesian components of the body's position and velocity - and an epoch, a time at which the elements are valid. For this reason, all sets of orbital elements contain exactly six parameters.

Keplerian Elements

The traditional orbital elements set are the six Keplerian elements, after Johannes Kepler and his Kepler's laws:

- Inclination ( $i$ )
- Longitude of the ascending node ( $\Omega$ )
- Argument of periapsis ( $w$ )
- Eccentricity ( $e$ )
- Semi major axis ( $a$ )
- Mean anomaly at epoch ( $M_0$ )

We see that the first three orbital elements are simply the Eulerian angles defining the orientation of the orbit relative to some defined inertial coordinate system. The next two establish the size and shape of the orbit, and the last establishes the location of the body within its orbit at the given time (epoch). Unperturbed, two-body orbits are always conic sections, so the Keplerian elements define an ellipse, a parabola, or a hyperbola. Real orbits have perturbations, so a given set of Keplerian elements is valid only at the epoch though the predictions are often adequate at times near the epoch.

The last element is "Mean anomaly at Epoch". The mean anomaly steadily increases by 360 degrees per orbit, so we must specify the time (epoch) at which it is measured. As mentioned above, real orbits are generally perturbed by small forces that can cause some or all of the Keplerian elements to change slowly with time, so the other elements are also strictly valid only at the epoch time. These are illustrated in Figure [A5].

Azimuth and Altitude

Azimuth is the angle around the horizon from due north and corresponds to the points on a compass. An azimuth of 0 degrees is due North, 90 degrees is due East, 180 degrees is due South, and 270 is due West. Altitude is the height of the star, in degrees above the horizon. Altitude can range from 0 degrees (on the horizon) to 90 degrees (directly overhead). as illustrated in Figure [A6].

The drawback to this system is that as a star rises and sets, it's position in the sky relative to the due north and its height change. This means that the azimuth and altitude change throughout the night and that observer at two different locations could see the same star at different azimuth altitude coordinates.

Right Ascension and Declination

Right ascension and declination are similar to longitude and latitude. The lines similar to the longitude lines on a globe are called Right Ascension. Right ascension is measured around the celestial equator towards the east. This angle is measured in hours, minutes, and seconds. A full rotation of 360 degrees is 24 hours, so each hour of right ascension is about 15 degrees along the celestial equator. An object with a right ascension of 0 hours lies on the Vernal Equinoctial. Declination is similar to latitude and measures how far above or below the celestial equator an object is. On object below the celestial equator has a negative declination; an object on the celestial equator has a declination of zero. Figure [A7] illustrtates these parameters.

Since the Right Ascension and Declination are relative to fixed stars, these coordinates do not change over time or with the position of the observer. [3-6]

Sidereal time

Solar Time is time measured with respect to the Sun. Sidereal Time is time measured with respect to the celestial sphere. [3-6]

Viewed from Earth, the celestial sphere rotates through 24h of RA in a Sidereal Day as illustrated in Figure [A8].

The Hour Angle (HA) of an object is its position, measured around the celestial equator, westward from the observer's meridian as illustrated in Figure [A9].

Rotation and Revolution

"Rotation" refers to an object's spinning motion about its own axis. "Revolution" refers the object's orbital motion around another object. For example, Earth *rotates* on its own axis, producing the 24-hour day. Earth *revolves* about the sun, producing the 365-day year. A satellite revolves around a planet.

Earth's Rotation

The Earth rotates on its axis relative to the sun every 24.0 hours mean solar time, with an inclination of 23.45 degrees from the plane of its orbit around the sun. Mean solar time represents an average of the variations caused by Earth's non-circular orbit. Its rotation relative to "fixed" stars (sidereal time) is 3 minutes 56.55 seconds shorter than the mean solar day, the equivalent of one solar day per year.

Precession of Earth's Axis

Forces associated with the rotation of the Earth cause the planet to be slightly oblate, displaying a bulge at the equator. The moon's gravity primarily, and to a lesser degree the sun's gravity, act on the Earth's oblateness to move the axis perpendicular to the plane of the Earth's orbit. However, due to gyroscopic action, Earth's poles do not "right themselves" to a position perpendicular to the orbital plane. Instead, they precess at 90 degrees to the force applied. This precession causes the axis of the Earth to describe a circle having a 23.4 degree radius relative to a fixed point in space over about 26,000 years, a slow wobble reminiscent of the axis of a spinning top swinging around before it falls over.

Because of the precession of the poles over 26,000 years, all the stars, and other celestial objects, appear to shift west to east at the rate of .014 degree each year (360 degrees in 26,000 years). This apparent motion is the main reason for astronomers as well as spacecraft operators to refer to a common epoch such as J2000.0.

At the present time in the Earth's 26,000 year precession cycle, a bright star happens to be very close, less than a degree, from the north celestial pole. This star is called Polaris, or the North Star as shown in Figure [A1].

Stars do have their own real motion, called proper motion. In our vicinity of the galaxy, only a few bright stars exhibit a large enough proper motion to measure over the course of a human lifetime, so their motion does not generally enter into spacecraft navigation. Because of their immense distance, stars can be treated as though they are references fixed in space. (Some stars at the center of our galaxy, though, display tremendous proper motion speeds as they orbit close to the massive black hole located there.)

Nutation

Superimposed on the 26,000-year precession is a small nodding motion with a period of 18.6 years and an amplitude of 9.2 arc seconds. This nutation can trace its cause to the 5 degree difference between the plane of the Moon's orbit, the plane of the Earth's orbit, and the gravitational tug on one other.

Revolution of Earth

Earth revolves in orbit around the sun in 365 days, 6 hours, 9 minutes with reference to the stars, at a speed ranging from 29.29 to 30.29 km/s. The 6 hours, 9 minutes adds up to about an extra day every fourth year, which is designated a leap year, with the extra day added as February 29th. Earth's orbit is elliptical and reaches its closest approach to the sun, a perihelion of 147,090,000 km, on about January fourth of each year. Aphelion comes six months later at 152,100,000 km.

Shorter-term Polar Motion

Aside from the long-term motions, the Earth's rotational axis and poles have two shorter periodic motions. One, called the Chandler wobble, is a free nutation with a period of about 435 days. There is also a yearly circular motion, and a steady drift toward the west caused by fluid motions in the Earth's mantle and on the surface. These motions are tracked by the International Earth Rotation and Reference Systems Service, IERS.

Epochs

Because we make observations from Earth, knowledge of Earth's natural motions is essential. As described above, our planet rotates on its axis daily and revolves around the sun annually. Its axis processes and nutates. Even the "fixed" stars move about on their own. Considering all these motions, a useful coordinate system for locating stars, planets, and spacecraft must be pinned to a single snapshot in time. This snapshot is called an epoch.

By convention, the epoch in use today is called J2000.0, which refers to the mean equator and equinox of year 2000, nominally January 1st 12:00 hours Universal Time (UT). The "J" means Julian year, which is 365.25 days long. Only the 26,000-year precession part of the whole precession/nutation effect is considered, defining the mean equator and equinox for the epoch.

The last epoch in use previously was B1950.0 - the mean equator and equinox of 1949 December 31st 22:09 UT, the "B" meaning Besselian year, the fictitious solar year introduced by F. W. Bessell in the nineteenth century. Equations are published for interpreting data based on past and present epochs.

4.0. Basics of Sun Tracking Algorithms and its Implementation

Given an understanding of the Earth's suite of motions -- rotation on axis, precession, nutation, short-term polar motions, and revolution around the sun -- and given knowledge of an observer's location in latitude and longitude, meaningful observations can be made. For example, to measure the precise speed of a spacecraft flying to Saturn, you have to know exactly where you are on the Earth's surface as you make the measurement, and then subtract out the Earth's motions from that measurement to obtain the spacecraft's speed. The same applies if you are trying to measure the proper motion of a distant star -- or a star's subtle wobble, to reveal a family of planets. [24]

The perfect reference for these algorithms is given by the book written by Jean Meeus namely Astronomical Algorithms [3-6, 27] which are explained below as used in SolarTimer software.

The information required for the computation of the sun's position:

- *Date* (Day, Month, Year) of the Gregorian calendar;
- *Time* (Hour, Minute, Second)
- *Geographic Longitude*$(L)$, Observer longitude (negative west of Greenwich) (-180 to 180 degrees)
- *Geographic Latitude*$(\phi)$, Observer latitude (negative south of equator). (-90 to 90 degrees)
- *Time zone*$(TZ)$, Observer time zone (negative west of Greenwich)

The celestial equator is the great circle that is the projection of Earth's equator onto the celestial sphere. Its plane is perpendicular to the axis of rotation of the Earth.

The celestial poles are the poles of the celestial equator, or the intersections of the axis of rotation of the Earth with the celestial sphere.

The ecliptic is defined to be the plane of the (undisturbed) orbit of the Earth around the sun.

The equinox or better, the vernal equinox, which is the zero point of both right ascension and celestial longitude, is defined to be in the direction of the ascending node of the ecliptic on the equator. It is that intersection of equator and ecliptic where the ecliptic runs (eastwards) from negative to positive declinations. The other intersection, which is diametrically opposite, is the autumnal equinox.

The equinoxes are the instants when the apparent longitude of the sun is 0° or 180°.

Solstices: both the points on the ecliptic 90 degrees away from the equinoxes, and the instants when the apparent longitude of the sun is 90° or 270°.

Celestial longitude, or ecliptic longitude, often called simply longitude, is measured (from 0° to 360°) from the vernal equinox, positive to the east, along the ecliptic.

Celestial latitude, or ecliptic latitude, or simply latitude, is measured (from 0° to +90° or -90°) from the ecliptic, positive to the north, negative to the south.

*Calculation of the Julian Day*

The Julian Day number or, more simply, the Julian Day is a continuous count of days and fractions thereof from the beginning of the year -4712. By tradition, the Julian Day begins at Greenwich mean noon, that is, at $12^h$ $12^h$ Universal Time.

$$A = INT\left(\frac{Y}{100}\right) \quad (1)$$

$$B = 2 - A + INT\left(\frac{A}{4}\right) \quad (2)$$

$$JD = INT(365.25(Y + 4716)) + INT(30.6001(M + 1)) + D + B - 1524.5 \quad (3)$$

Where,

- $INT$ is the Integer of the calculated terms.

-$Y$ is the year.

-$M$ is the month of the year.

-$D$ is the day of the month with decimal time.

*Calculation of the Julian Centuries* $(T)$

Calculate the JD corresponding to that date at $0^h$ UT. Thus, this is as a number ending on .5. Then find $T$ by $$T = \frac{JD - 2451545}{36525} \quad (4)$$

*Calculation of the Julian Millennium* $(\tau)$ $$\tau = \frac{T}{10} \quad (5)$$

*Geometric mean longitude of the Sun* $(L_0)$

Referred to the mean equinox of the date, is given by $$L_0 = 280.4664567 + 360007.6982279\tau + 0.0303202\tau^2 + \frac{\tau^3}{49931} - \frac{\tau^4}{15299} - \frac{\tau^5}{1988000} \quad (6)$$

*Sun Mean Anomaly* $(M)$

The anomaly is the angular distance, as seen from the sun, between the perihelion and the mean position of the planet and is given by:

$$M = 357.52910 + 35999.05030T + 0.0001559T^2 - 0.00000048T^3 \quad (7)$$

*Eccentricity of the orbit of the Earth around the Sun* $(e)$

The eccentricity is the ratio between the semi-major axis and the difference between the semi-major and semi-minor axis of the elliptic orbit of the Earth around the sun and is:

$$e = 0.016708617 - 0.000042037T - 0.0000001236T^2 \quad (8)$$

*Equation of the center* $(C)$

The equation of center is the difference between the true and the mean anomalies $(C = v - M)$; it is the difference between the actual position of the body in the elliptic orbit and the position the body would have if its angular motion were uniform.

$$C = (1.914600 - 0.004817T - 0.000014T^2)\sin M + (0.019993 - 0.000101T)\sin 2M + 0.000290\sin 3M \quad (9)$$

*True longitude of the Sun* $(\Theta)$ $$\Theta = L_0 + C \quad (10)$$

*True anomaly* $(v)$

The angular distance measured from the perihelion to the true position of the planet is called the true anomaly.

$$v = M + C \quad (11)$$

Radius Vector $(R)$

The straight line connecting a body to the central body around which it resolves, or the distance between these bodies at a given instant. The radius vector of a planet or a comet is generally expressed in astronomical units.

$$R = \frac{1.000001018(1 - e^2)}{1 + e\cos v} \quad (12)$$

*Longitude of the Moon's ascending node Ω*

Longitude of the ascending node of the Moon's mean orbit on the ecliptic, measured from the mean equinox of the date.

$$\Omega = 125.04452 - 1934.136261T + 0.0020708T^2 + \frac{T^3}{450000} \quad (13)$$

*Apparent longitude of the Sun ecliptic* ($\lambda$)

The ecliptic longitude of the sun is corrected for the nutation and the aberration. The nutation is the deviation of the Earth's axis of rotation, referred to the precession of the equinox.

$$\lambda = \Theta - 0.00569 - 0.00478 \sin \Omega \quad (14)$$

*The mean obliquity of the ecliptic*

$$\varepsilon_0 = 23°26'21''.448 - 46''.8150T - 0''.00059T^2 + 0''.001813T^3 \quad (15)$$

*The true obliquity of the ecliptic* ($\varepsilon$)

$$\varepsilon = \varepsilon_0 + 0.00256 \cos(125.04 - 1934.136T) \quad (16)$$

*Declination of the Sun* ($\delta$)

Declination is measured (from 0° to ±90°) from the equator, positive to the north, negative to the south.

$$\sin \delta = \sin \varepsilon \sin \Theta \quad (17)$$

*Right ascension of the Sun* ($\alpha$)

Right ascension is measured (from 0 to 24 hours, sometimes from 0° to 360°) from the vernal equinox, positive to the east, along the celestial equator.

$$\tan \alpha = \frac{\cos \varepsilon \sin \Theta}{\cos \Theta} \quad (18)$$

*Being the obliquity of the ecliptic* ($y$)

$$y = \tan^2 \frac{\varepsilon}{2} \quad (19)$$

*Equation of Time(in degrees) (E)*

$$E = y\sin(2L_0) - 2e\sin(M) + 4ey\sin(M)\cos(2L_0) - \frac{1}{2}y^2\sin(4L_0) - \frac{5}{4}e^2\sin(2M) \quad (20)$$

*Sunrise Hour angle(H*₀)*

$$\cos H_0 = \frac{\sin h_0 - \sin\phi\sin\delta}{\cos\phi\cos\delta} \quad (21)$$

$h_0$ :*Standard altitude*

$h_0 = -0^{\circ}.34' = -0.5667$ for stars and planets $h_0 = -0^{\circ}.50' = -0.8333$ for the sun

*Sunrise and Sunset*

Suppose we wish to calculate the times, in Universal Time, of rising, of transit (when the body crosses the local meridian at upper culmination) and of setting of a celestial body at the observer's place on a given date D.

$\alpha_1$ and $\delta_1$ on day $D-1$ at $0^h$ Dynamical Time $\alpha_2$ and $\delta_2$ on day $D$ at $0^h$ Dynamical Time $\alpha_3$ and $\delta_3$ on day $D+1$ at $0^h$ Dynamical Time For the transit : $m_0 = \frac{\alpha_2 + L - \theta_0}{360}$ (22)

For the rising : $m_1 = m_0 - \frac{H_0}{360}$ (23)

For the setting : $m_2 = m_0 + \frac{H_0}{360}$ (24)

These three values m are times, on day D, expressed as fractions of day. Hence, they should be between 0 and +1. If one or more of them are outside of this range, add or subtract 1.

Find the sidereal time at Greenwich, in degrees, from $$\theta = \theta_0 + 360.985647m \quad (25)$$

Where $m$ is either $m_0, m_1$ or $m_2$ $m_0$ , $m_1$ or $m_2$ .

Find the local hour angle of the body from $$H = \theta - L - \alpha \quad (26)$$

Then the correction to $m$ will be found as follows:

- In the case of a transit, $$\Delta m = -\frac{H}{360} \quad (27)$$

- In the case of a rising or a setting, $$\Delta m = \frac{h - h_0}{360 \cos\delta \cos\phi \sin H} \quad (28)$$

The corrected value of $m$ is then $m + \Delta m$ .

Azimuth Angle $(A)$

The angular distance measured from the South, positive to the West, along the horizon, to the vertical circle through the point in question. Navigators and meteorologists measure the azimuth from the North, positive to the East.

$$\tan A = \frac{\sin H}{\cos H \sin\phi - \tan\delta \cos\phi} \quad (29)$$

*Elevation Angle* $(h)$ $$\sinh = \sin\phi \sin\delta + \cos\phi \cos\delta \cos H \quad (30)$$

It is also known that the altitude is important in calculating the sunset and sundown. This effect is included in the algorithms as, $$\cos H_0 = \frac{\sin(h_0 - 0.0347\sqrt{h_e}) - \sin\phi \sin\delta}{\cos\phi \cos\delta} \quad (31)$$

$h_e$ : Elevation in meters.

$\delta$ : Declination Angle $h_0$ :*Standard altitude*

$h_0 = -0^{o}.34' = -0.5667$ for stars ad planets $h_0 = -0^{o}.50' = -0.8333$ for the sun For sunset and sundown there are some atmospheric effects which needs to be considered for some extreme conditions. The refractive index of the atmosphere is very close to the vacuum which is 1.0001. This changes very slightly with temperature and atmospheric pressure.

The true elevation angles of the sun are not corrected for atmospheric refraction, which is bending the light while passing through the Earth's atmosphere. The effect of refraction depends on atmospheric conditions (pressure, temperature, relative humidity) and on the wavelength. For mean conditions (P=1010 hPa, T=10°C, yellow light) the refraction R is calculated by Saemundsson's formula:

$$R = \frac{1.02}{\tan\left(h + \frac{10.3}{h+5.11}\right)} \quad (36)$$

$h$ : Elevation angle (degrees)

If the pressure at the Earth's surface is P milibars, and the air temperature is T degrees Celsius, then the values of R given by formula should be multiplied by $$\frac{P}{1010}\frac{283}{273+T} \quad (37)$$

The amount of refraction increases by about 1% for every 3 °C colder, and by about 1% for every 9 hPa higher pressure.

As a consequence of the refraction, the solar disc seems to be flattened near the horizon. At sunrise, when the apparent lower limb is just on the horizon, the apparent vertical diameter of the sun is 26.9', and the apparent flattening ratio is $$\frac{26.9}{32} = 0.84 \quad (38)$$

*Twilight*

Twilight is the time between dawn and sunrise, and between sunset and dusk. Twilight is defined according to the solar elevation angle 0s, which is the position of the geometric center of the sun relative to the horizon. There are three twilight: civil twilight (brightest), nautical twilight and astronomical twilight (darkest) as shown in Figure [A10].

APPENDIX DRAWINGS

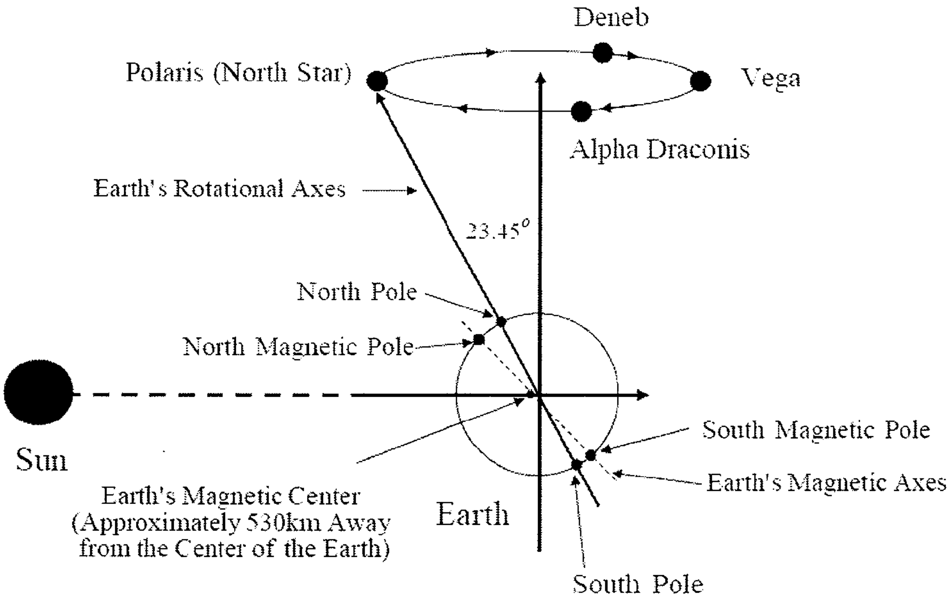
Figure A1

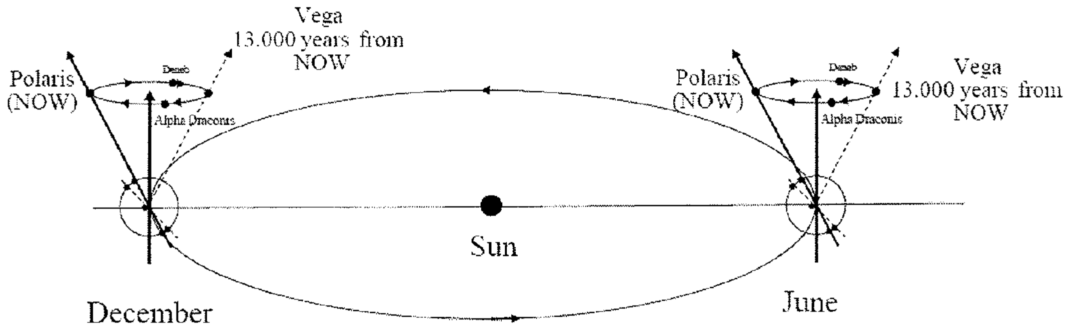
Figure A2

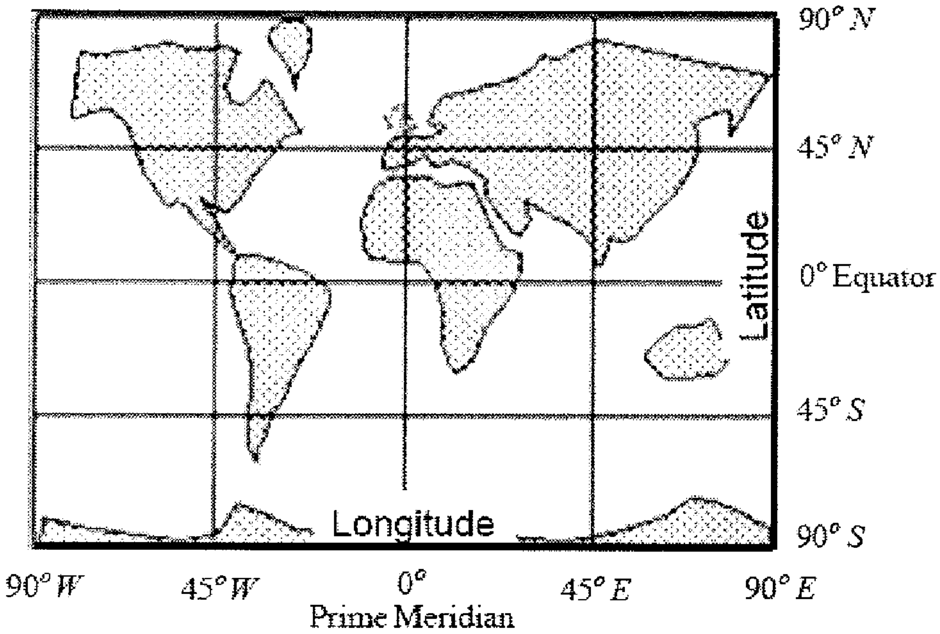
Figure A3

*Eccentric Anomaly (E)*
The angular distance between the Perihelion of an orbit and a given point on a circle around the orbit, as seen from the centre of the orbit.

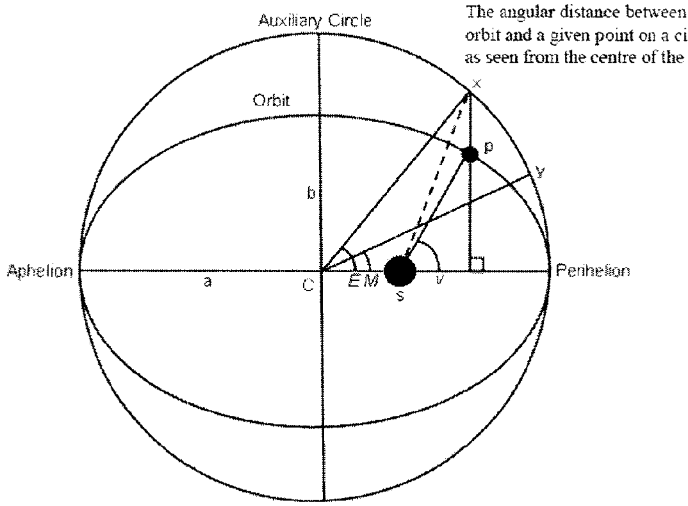

*Mean Anomaly (M)*
The anomaly is the angular distance, as seen from the Sun, between the perihelion and the mean position of the planet.

*True Anomaly (v)*
The angular distance measured from the perihelion to the true position of the planet is called the true anomaly.

Figure A4

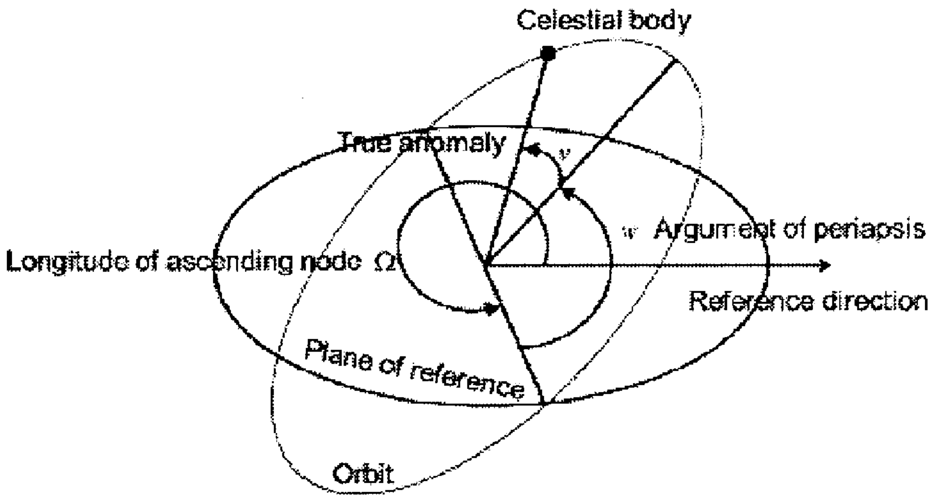
Figure A5

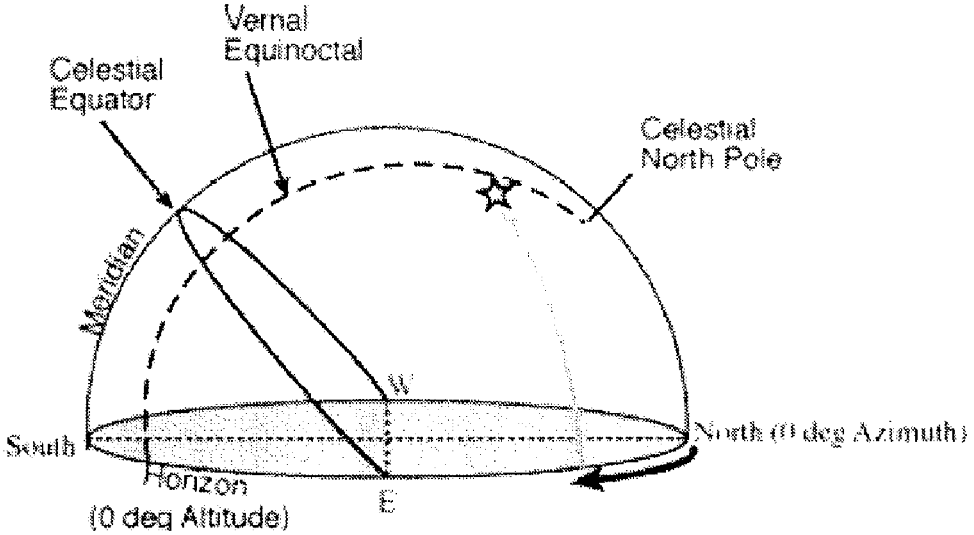
Figure A6

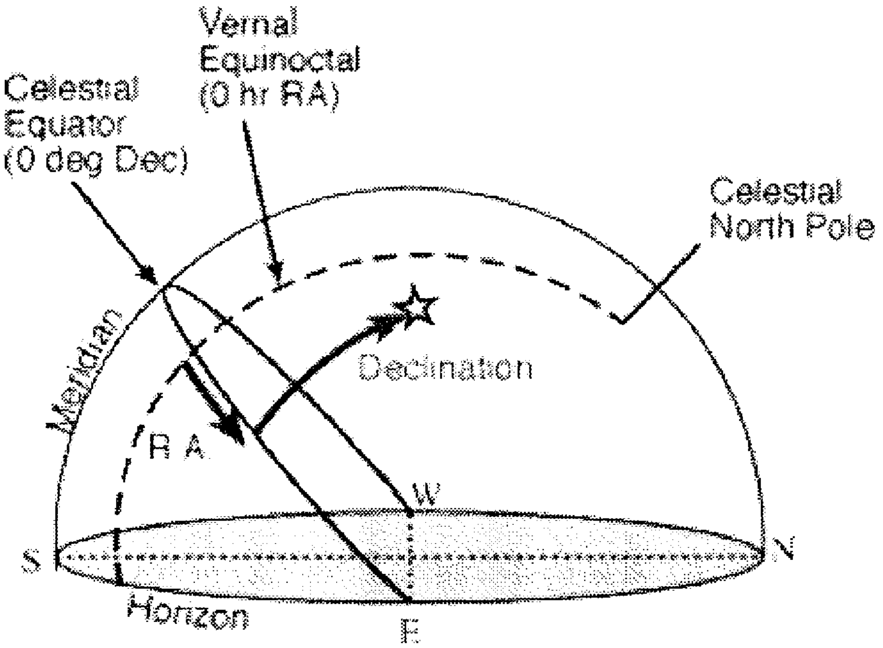
Figure A7

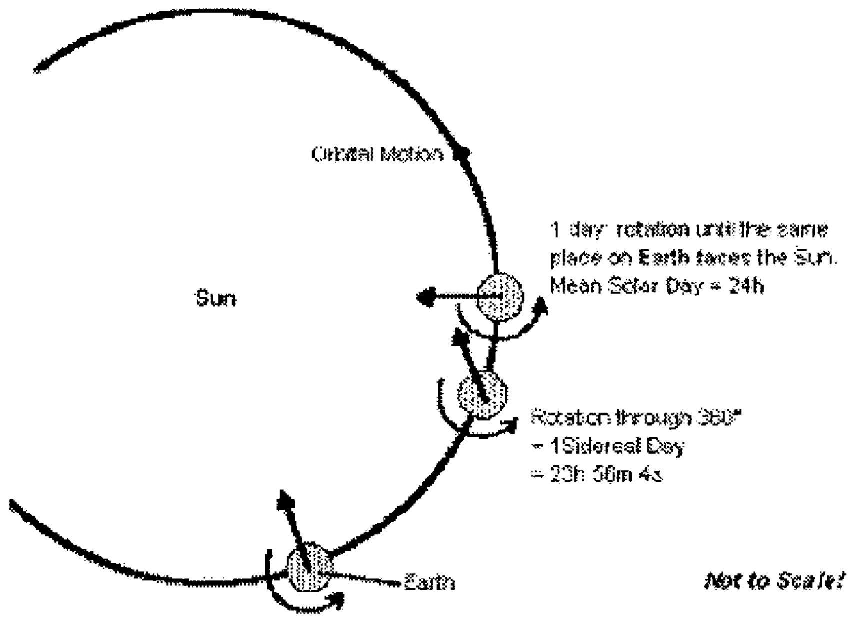
Figure A8

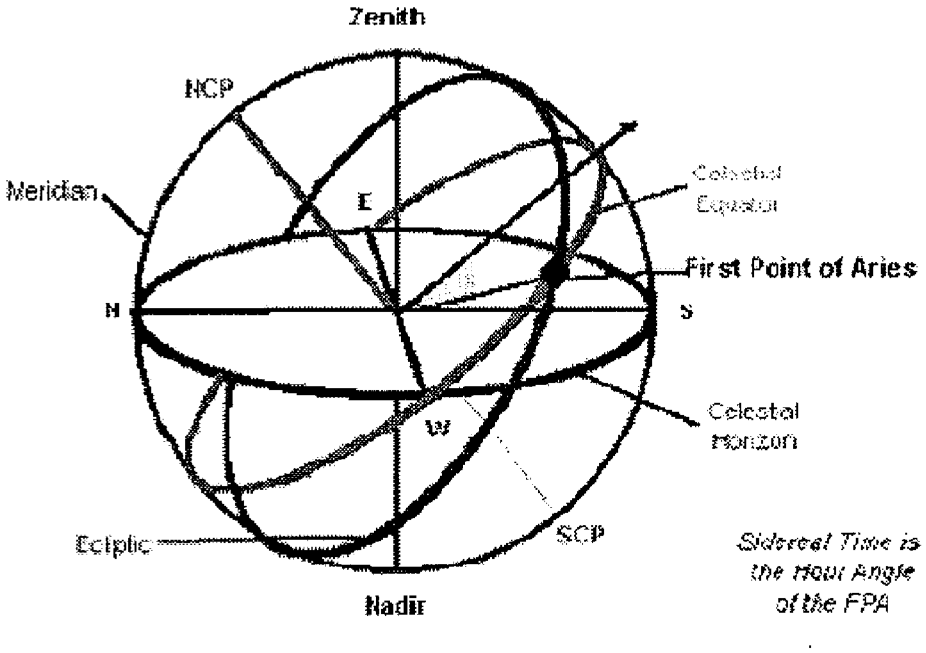
Figure A9

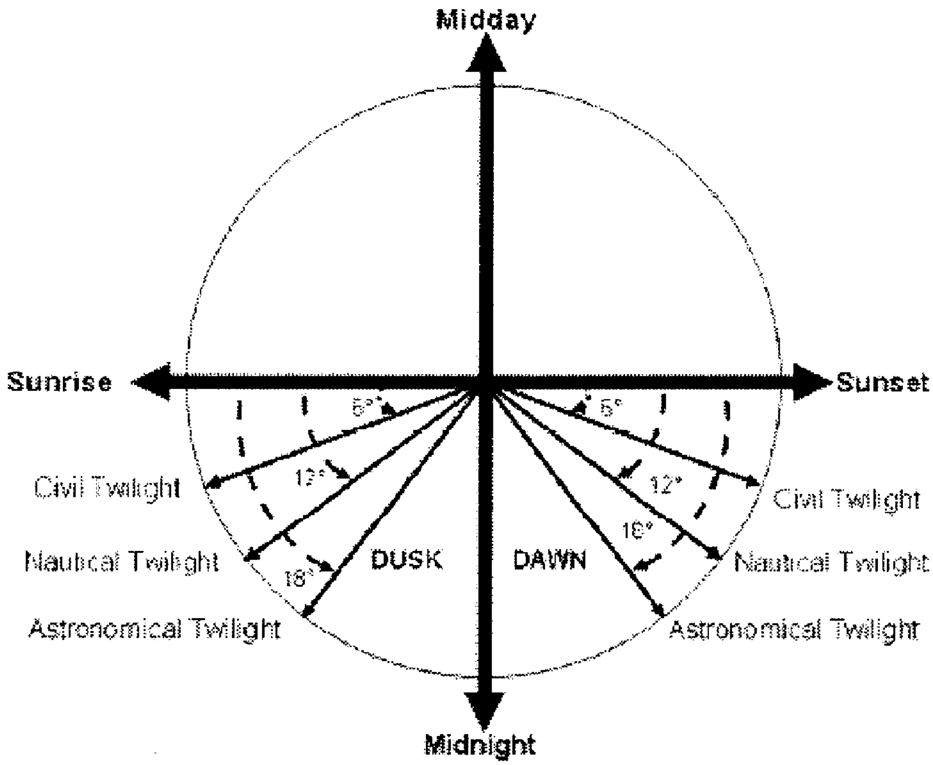
Figure A10

What is claimed is:

1. A computer-readable non-transitory storage medium embodying information indicative of instructions for a dynamic compass application, the instructions causing one or more computers to perform operations comprising:

providing a target location;

calculating a first location of a mobile device based on global positioning system (GPS) signals received at a mobile device;

establishing the first location as a reference location in response to a user input on the mobile device;

determining, by the mobile device, that the mobile device with the GPS receiver has been physically moved by the user a sufficient distance from the reference location to obtain a preselected accuracy for directional information to the target location;

indicating, on a display of the mobile device, that the mobile device has moved the sufficient distance;

accepting an input from a user signifying that the user has aimed the mobile device toward the reference location;

computing a second location of the mobile device based on GPS signals received at the mobile device;

generating a reference line between the reference location and the second location, the mobile device being aimed along the reference line at the reference location;

determining an angle between the reference line and a target location; and displaying, on a display of the mobile device, the angle to the target location by which the user can turn the mobile device from aiming along the reference line at the reference location to correctly point to the target location.

2. The medium of claim 1 wherein the first location is established at a first point in time and the second location is computed at a second point in time, the operations further comprising:

depicting, on the display of the mobile device, solar, terrestrial, and lunar positions in time and direction with respect to the mobile device;

calculating and displaying sunrise and sunset angles and times of a current date and a season for a specific position on Earth; and calculating and displaying moon phases and times of the current date.

3. The medium of claim 1 wherein the first location is established at a first point in time and the second location is computed at a second point in time, wherein the operations further comprise:

depicting, on the display of the mobile device, solar, terrestrial, and lunar positions in time and direction with respect to the mobile device;

calculating and displaying sunrise and sunset angles and times of a current date and a season for a specific position on Earth; and calculating and displaying moon phases and times of the current date.

4. The medium of claim 1 wherein the operations further comprise:

determining, from information input to the mobile device, a chosen terrestrial location at a first point in time, wherein the determining of information on the terrestrial-position-specific solar location is based on the chosen terrestrial location, wherein the determining of the terrestrial-position-specific lunar location information is based on the chosen terrestrial location.

5. The medium of claim 1 wherein the operations further comprise:

determining information on a terrestrial-position-specific solar location based at least in part on the second location and information on a first lunar position that indicates a position of the moon relative to the second location;

determining terrestrial-position-specific lunar location information based at least in part on the second location and said information on the terrestrial-position-specific solar location that indicates a position of the sun relative to a second terrestrial location that may be the same as the second location; and displaying, on the display of the mobile device, a first display region that includes a plurality of display elements, wherein a first display element of the plurality of display elements indicates the terrestrial-position-specific lunar location information, and a second display element of the plurality of display elements indicates the terrestrial-position-specific solar location information.

6. The medium of claim 5 wherein the operations further comprise:

displaying a second display region that includes: (a) a map element that is generated based at least in part on the chosen location information; and (b) a compass display that is at least partially overlaid over the map element.

7. The medium of claim 5 wherein the operations further comprise:

calculating and displaying sunrise and sunset angles and times of a current date and a season for a specific position on Earth;

calculating and displaying moon phases and times of a current date; and producing a compass display.

8. The medium of claim 5 wherein the operations further comprise:

determining, from information input to the mobile device, a chosen terrestrial location at a first point in time, wherein the determining of information on the terrestrial-position-specific solar location is based on the chosen terrestrial location, wherein the determining of the terrestrial-position-specific lunar location information is based on the chosen terrestrial location.

9. A method comprising:

providing a target location;

calculating a first location of a mobile device based on global positioning system (GPS) signals received at a mobile device;

establishing the first location as a reference location in response to a user input on the mobile device;

determining, by the mobile device, that the mobile device with the GPS receiver has been physically moved by the user a sufficient distance from the reference location to obtain a preselected accuracy for directional information to the target location;

indicating, on a display of the mobile device, that the mobile device has moved the sufficient distance;

accepting an input from a user signifying that the user has aimed the mobile device toward the reference location;

computing a second location of the mobile device based on GPS signals received at the mobile device;

generating a reference line between the reference location and the second location, the mobile device being aimed along the reference line at the reference location;

determining an angle between the reference line and a target location; and displaying, on a display of the mobile device, the angle to the target location by which the user can turn the mobile device from aiming along the reference line at the reference location to correctly point to the target location.

10. The method of claim 9 further comprising:

determining information on a terrestrial-position-specific solar location based at least in part on the second location and information on a first lunar position that indicates a position of the moon relative to the second location;

determining terrestrial-position-specific lunar location information based at least in part on the second location and said information on the terrestrial-position-specific solar location that indicates a position of the sun relative to a second terrestrial location that may be the same as the second location; and displaying, on the display of the mobile device, a first display region that includes a plurality of display elements, wherein a first display element of the plurality of display elements indicates the terrestrial-position-specific lunar location information, and a second display element of the plurality of display elements indicates the terrestrial-position-specific solar location information.

11. The method of claim 10 further comprising:

displaying a second display region that includes: (a) a map element that is generated based at least in part on a chosen location information at a first point in time; and (b) a compass display that is at least partially overlaid over the map element.

12. The method of claim 10 further comprising:

calculating and displaying sunrise and sunset angles and times of a current date and a season for a specific position on Earth;

calculating and displaying moon phases and times of a current date; and producing a compass display.

13. The system of claim 10 wherein the instructions further comprise:

program code for determining, from information input to the mobile device, a chosen terrestrial location at a first point in time, wherein the determining of information on the terrestrial-position-specific solar location is based on the chosen terrestrial location, wherein the determining of the terrestrial-position-specific lunar location information is based on the chosen terrestrial location.

14. A dynamic compass application system comprising:

at least one processor;

a memory coupled to the at least one processor, the processor executing instructions from the memory comprising:

program code for providing a target location;

program code for calculating a first location of a mobile device based on global positioning system (GPS) signals received at a mobile device;

program code for establishing the first location as a reference location in response to a user input on the mobile device;

program code for determining, by the mobile device, that the mobile device with the GPS receiver has been physically moved by the user a sufficient distance from the reference location to obtain a preselected accuracy for the directional information to the target location;

program code for indicating, on a display of the mobile device, that the mobile device has moved the sufficient distance;

program code for accepting an input from a user signifying that the user has aimed the mobile device toward the reference location;

program code for computing a second location of the mobile device based on GPS signals received at the mobile device;

program code for generating a reference line between the reference location and the second location, the mobile device being aimed along the reference line at the reference location;

program code for determining an angle between the reference line and a target location; and program code for displaying, on a display of the mobile device, the angle to the target location by which the user can turn the mobile device from aiming along the reference line at the reference location to correctly point to the target location.

15. The system of claim 14 wherein the instructions further comprise:

program code for determining information on a terrestrial-position-specific solar location based at least in part on the second location and information on a first lunar position that indicates a position of the moon relative to the second location;

program code for determining terrestrial-position-specific lunar location information based at least in part on the second location and said information on the terrestrial-position-specific solar location that indicates a position of the sun relative to a second terrestrial location that may be the same as the second location; and program code for displaying, on the display of the mobile device, a first display region that includes a plurality of display elements, wherein a first display element of the plurality of display elements indicates the terrestrial-position-specific lunar location information, and a second display element of the plurality of display elements indicates the terrestrial-position-specific solar location information.

16. The system of claim 15 wherein the instructions further comprise:

program code for displaying a second display region that includes: (a) a map element that is generated based at least in part on a chosen location information at a first point in time; and (b) a compass display that is at least partially overlaid over the map element.

17. The system of claim 15 wherein the instructions further comprise:

program code for calculating and displaying sunrise and sunset angles and times of a current date and a season for a specific position on Earth;

program code for calculating and displaying moon phases and times of a current date; and program code for producing a compass display.

18. The system of claim 14 wherein the first location is established at a first point in time and the second location is computed at a second point in time, the instructions further comprising:

program code for depicting, on the display of the mobile device, solar, terrestrial, and lunar positions in time and direction with respect to the mobile device;

program code for calculating and displaying sunrise and sunset angles and times of a current date and a season for a specific position on Earth; and program code for calculating and displaying moon phases and times of the current date.

19. The system of claim 18 wherein the instructions further comprise:

program code for determining, from information input to the mobile device, a chosen terrestrial location at a first point in time, wherein the determining of information on the terrestrial-position-specific solar location is based on the chosen terrestrial location, wherein the determining of the terrestrial-position-specific lunar location information is based on the chosen terrestrial location.

20. The system of claim 18 wherein the first location is established at a first point in time and the second location is computed at a second point in time, wherein the instructions further comprise:

program code for depicting, on the display of the mobile device, solar, terrestrial, and lunar positions in time and direction with respect to the mobile device;

program code for calculating and displaying sunrise and sunset angles and times of a current date and a season for a specific position on Earth; and program code for calculating and displaying moon phases and times of the current date.

* * * * *